US010700635B2

United States Patent
Nam et al.

(10) Patent No.: US 10,700,635 B2
(45) Date of Patent: Jun. 30, 2020

(54) SOLAR CELL MODULE

(71) Applicant: LG ELECTRONICS INC., Seoul (KR)

(72) Inventors: Hyukjin Nam, Seoul (KR); Joonho Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/693,666

(22) Filed: Apr. 22, 2015

(65) Prior Publication Data

US 2015/0311861 A1 Oct. 29, 2015

(30) Foreign Application Priority Data

Apr. 23, 2014 (KR) .................. 10-2014-0048885

(51) Int. Cl.
*H02S 40/32* (2014.01)

(52) U.S. Cl.
CPC .............. *H02S 40/32* (2014.12); *Y02E 10/52* (2013.01)

(58) Field of Classification Search
CPC .................................. H02S 40/32; H02S 40/34
See application file for complete search history.

(56) References Cited

U.S. PATENT DOCUMENTS

| | | | | |
|---|---|---|---|---|
| 7,291,036 | B1* | 11/2007 | Daily ................. | H05K 7/20445 439/487 |
| 2002/0179140 | A1* | 12/2002 | Toyomura .............. | H02S 40/32 136/251 |
| 2010/0218797 | A1* | 9/2010 | Coyle, Jr. .............. | H05K 7/026 136/243 |
| 2010/0263704 | A1* | 10/2010 | Fornage .................. | H02S 40/32 136/244 |
| 2010/0294528 | A1 | 11/2010 | Sella et al. | |
| 2012/0081934 | A1 | 4/2012 | Garrity et al. | |
| 2012/0325288 | A1* | 12/2012 | Jang ........................ | H02J 3/385 136/246 |

(Continued)

FOREIGN PATENT DOCUMENTS

| | | |
|---|---|---|
| DE | 10323982 A1 | 12/2004 |
| EP | 1263039 A2 | 12/2002 |

(Continued)

OTHER PUBLICATIONS

Solar Power World, "What are the different types of solar inverters?" 2016, https://www.solarpowerworldonline.com/2016/05/different-types-solar-inverters/, All Pages. (Year: 2016).*

*Primary Examiner* — Jeffrey T Barton
*Assistant Examiner* — Daniel P Malley, Jr.
(74) *Attorney, Agent, or Firm* — Birch, Stewart, Kolasch & Birch, LLP

(57) ABSTRACT

A solar cell module is discussed. The solar cell module includes a solar cell panel and an integrated type inverter positioned at a back surface of the solar cell panel. The integrated type inverter includes a circuit unit having a terminal connected to the solar cell panel and an inverter member having a DC-AC inverter electrically connected to the terminal, and a receiving unit receiving the terminal and the DC-AC inverter, the receiving unit having at least one open surface. One of the open surfaces of the receiving unit is covered by the solar cell panel.

18 Claims, 12 Drawing Sheets

(56) References Cited

U.S. PATENT DOCUMENTS

| | | | | |
|---|---|---|---|---|
| 2013/0029542 A1* | 1/2013 | Kraemer | .............. | H01R 4/4809 |
| | | | | 439/843 |
| 2013/0255749 A1* | 10/2013 | Kinyon | ................ | H02S 40/345 |
| | | | | 136/246 |
| 2013/0255999 A1* | 10/2013 | Buller | ...................... | H05K 7/06 |
| | | | | 174/251 |
| 2015/0003021 A1* | 1/2015 | Chang | .................. | H05K 7/1432 |
| | | | | 361/728 |

FOREIGN PATENT DOCUMENTS

| | | |
|---|---|---|
| EP | 1874103 A2 | 1/2008 |
| EP | 2242113 A2 | 10/2010 |
| JP | 2001-24206 A | 1/2001 |
| JP | 2003-52185 A | 2/2003 |
| JP | 2003-197944 A | 7/2003 |
| JP | 2010-259319 A | 11/2010 |
| JP | 2011-204974 A | 10/2011 |
| JP | 2012-527767 A | 11/2012 |
| JP | 3185702 U | 8/2013 |

\* cited by examiner (a)

(b)

SOLAR CELL MODULE

CROSS-REFERENCE TO RELATED APPLICATION

This application claims the priority benefit of Korean Patent Application No. 10-2014-0048885, filed on Apr. 23, 2014 in the Korean Intellectual Property Office, the disclosure of which is incorporated herein by reference.

BACKGROUND OF THE INVENTION

1. Field of the Invention

Embodiments of the invention relate to a solar cell module, and more particularly to a solar cell module with an improved structure.

2. Description of the Related Art

In recent years, exhaustion of existing energy resources, such as petroleum and coal, has been forecast with the result that interest in alternative energy resources able to substitute for the existing energy resources has risen. Among such alternative energy resources is a solar cell that converts photovoltaic energy into electrical energy, which is in the spotlight as a next-generation cell.

A solar cell panel including a solar cell is connected to a junction box, which is connected to a DC-AC inverter via a DC output cable extending from the junction box. More specifically, a DC voltage or a DC current supplied through a positive (+) output cable and a negative (−) output cable extending from the junction box is converted into an AC voltage or an AC current by the DC-AC inverter. The AC voltage or the AC current converted by the DC-AC inverter is supplied to another solar cell module, a power network, or a power system via an AC output cable.

The junction box and the DC-AC inverter are separately manufactured (e.g. the junction box and the DC-AC inverter are separately manufactured and then installed in separate cases). In an instance in which the junction box and the DC-AC inverter are applied to a solar cell module, therefore, an installation space and installation time are increased. In addition, the DC output cables (i.e. the two output cables) are connected between the junction box and the DC-AC inverter. As a result, the installation space and installation time are further increased. In particular, the volume and weight of the output cables are large with the result that it is difficult to install the output cables. For these reasons, productivity of the junction box and the DC-AC inverter is very low. In addition, the two output cables connected between the junction box and the DC-AC inverter may be loosened or be separated from the junction box and the DC-AC inverter during transportation or use. As a result, the two output cables may collide with the solar cell panel, whereby the solar cell panel may be damaged.

SUMMARY OF THE INVENTION

Therefore, the invention has been made in view of the above problems, and it is an object of the invention to provide a solar cell module with a simplified structure and improved structural stability.

In accordance with an aspect of the invention, the above and other objects can be accomplished by the provision of a solar cell module including a solar cell panel and an integrated type inverter positioned at a back surface of the solar cell panel. The integrated type inverter includes a circuit unit including a terminal connected to the solar cell panel and an inverter member including a DC-AC inverter electrically connected to the terminal, and a receiving unit for receiving the terminal and the DC-AC inverter, the receiving unit having at least one open surface. One of the open surfaces of the receiving unit is covered by the solar cell panel.

BRIEF DESCRIPTION OF THE DRAWINGS

The above and other objects, features and other advantages of the invention will be more clearly understood from the following detailed description taken in conjunction with the accompanying drawings, in which.

DETAILED DESCRIPTION OF THE EMBODIMENTS

Figure 1:
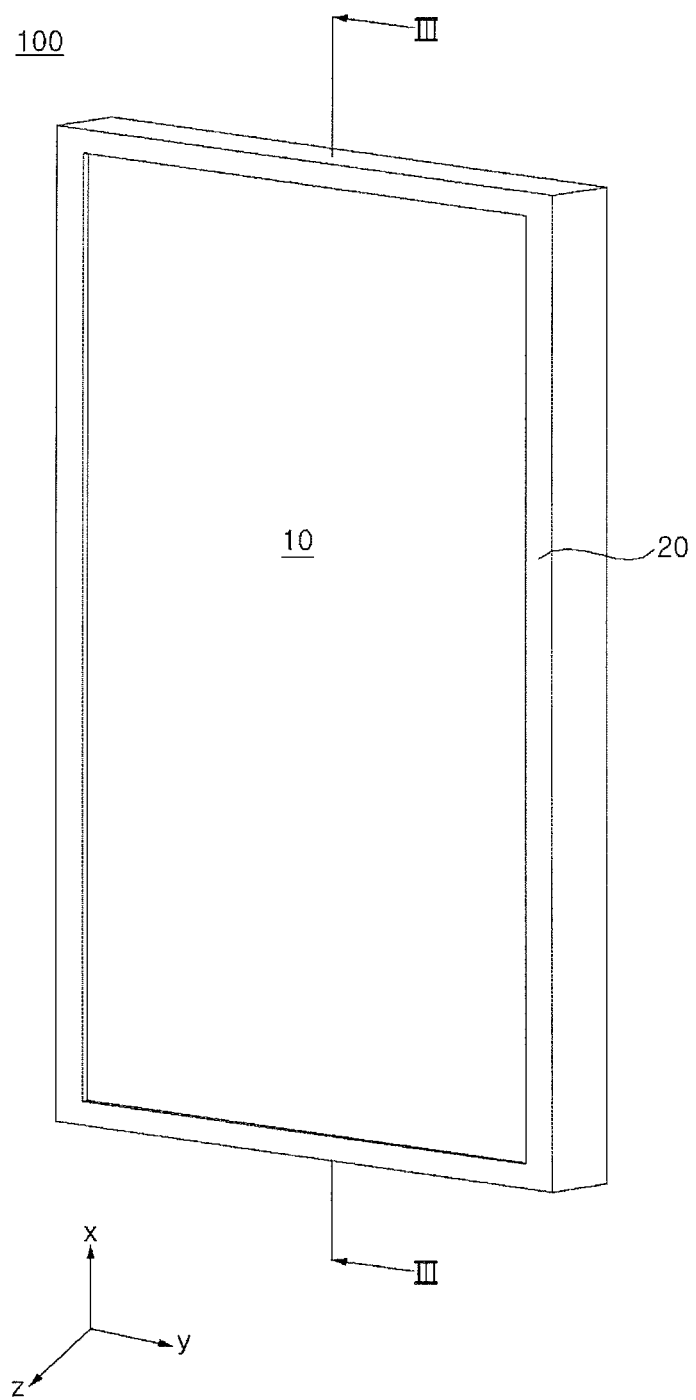
FIG. 1 is a front perspective view showing a solar cell module according to an embodiment of the invention.

Reference will now be made in detail to the example embodiments of the invention, examples of which are illustrated in the accompanying drawings. However, it will be understood that the invention should not be limited to only these embodiments and may be modified in various ways.

In the drawings, to clearly and briefly explain the invention, illustration of elements having no connection with the description is omitted, and the same or similar elements are designated by the same reference numerals throughout the specification. In addition, in the drawings, for more clear explanation, the dimensions of elements, such as thickness, width, and the like, are exaggerated or reduced, and thus the thickness, width, and the like of the invention are not limited to the illustration of the drawings.

In the entire specification, when an element is referred to as "including" another element, the element should not be understood as excluding other elements so long as there is no particular conflicting description, and the element may include at least one other element. In addition, it will be understood that, when an element such as a layer, film, region or substrate is referred to as being "on" another element, it can be directly on the other element or intervening elements may also be present. On the other hand, when an element such as a layer, film, region or substrate is referred to as being "directly on" another element, this means that there are no intervening elements therebetween.

Hereinafter, a solar cell module according to an embodiment of the invention will be described in detail with reference to the accompanying drawings.

Figure 2:
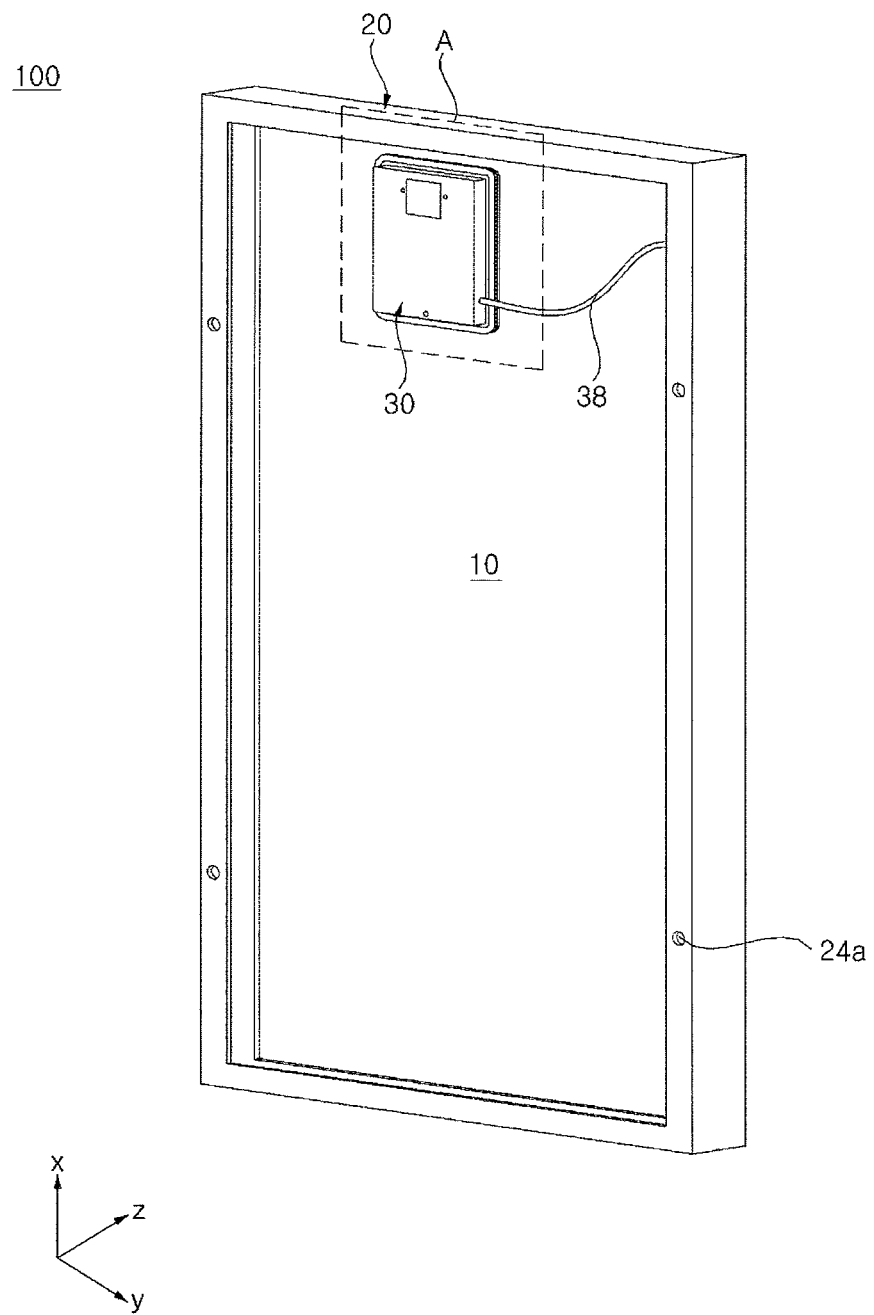
FIG. 2 is a rear perspective view showing the solar cell module of FIG. 1.
Figure 3:
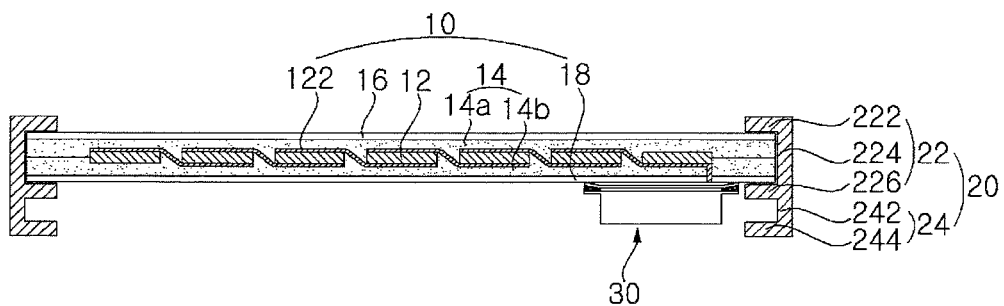
FIG. 3 is a sectional view taken along line III-III of FIG. 1.
Figure 3:
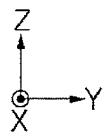

FIG. 1 is a front perspective view showing a solar cell module according to an embodiment of the invention, and FIG. 2 is a rear perspective view showing the solar cell module of FIG. 1. FIG. 3 is a sectional view taken along line III-III of FIG. 1.

Referring to FIGS. 1 to 3, a solar cell module 100 according to this embodiment of the invention includes a solar cell panel 10 including at least one solar cell 12 and an integrated type inverter 30 mounted at the back surface of the solar cell panel 10 such that the integrated type inverter 30 is connected to the solar cell panel 10. At least one surface of the integrated type inverter 30 is open. One of the open surfaces of the integrated type inverter 30 is positioned on the solar cell panel side such that one of the open surfaces of the integrated type inverter 30 can be covered by the solar cell panel 10. The solar cell module 100 may further include a frame 20 for fixing the edge of the solar cell panel 10. Between the solar cell panel 10 and the frame 20 may be positioned a sealing member for sealing a space defined between the solar cell panel 10 and the frame 20 by adhesion.

The solar cell panel 10 includes at least one solar cell 12. The solar cell panel 10 may further include a sealing layer 14 for sealing the solar cell 12 while wrapping the solar cell 12, a front substrate 16 positioned at the front surface of the solar cell 12 on one surface of the sealing layer 14, and a back substrate 18 positioned at the back surface of the solar cell 12 on the other surface of the sealing layer 14.

For example, the solar cell 12 may include a semiconductor substrate (e.g. a single crystalline semiconductor substrate, more specifically a single crystalline silicon wafer), first and second conductive regions formed in the semiconductor substrate or on the semiconductor substrate, the first and second conductive regions being of opposite conductive types, and first and second electrodes respectively connected to the first and second conductive regions. The semiconductor substrate may be of a p-type or an n-type having a low doping concentration. One of the first and second conductive regions may be of a p-type, and the other of the first and second conductive regions may be of an n-type. In addition, the first or second conductive region may be a doped region formed by doping a portion of the semiconductor substrate with a dopant. Alternatively, the first or second conductive region may be a semiconductor layer separately formed on the semiconductor substrate, the semiconductor layer being doped with a dopant. A plurality of solar cells 12 may be provided. A first electrode of one solar cell 12 and a second electrode of a neighboring solar cell 12 may be connected to each other via a ribbon 122. As a result, the solar cells 12 may constitute a solar cell string in which the solar cells 12 are arranged in line. The structure of each solar cell 12 and the structure in which the solar cells 12 are connected are conventional.

As described above, in this embodiment of the invention, a silicon single crystalline semiconductor solar cell is used as the solar cell 12. The silicon single crystalline semiconductor solar cell may exhibit excellent electrical properties since the silicon single crystalline semiconductor solar cell is based on the semiconductor substrate formed of the single crystalline semiconductor, which has high crystallinity and thus few defects. However, the invention is not limited thereto. For example, various solar cells, such as a thin film solar cell, a dye-sensitized solar cell, a tandem solar cell, and a compound semiconductor solar cell, having different structures may be used as the solar cell 12. In this embodiment of the invention, a plurality of solar cells 12 is provided. Alternatively, only one solar cell 12 may be provided.

The sealing layer 14 may include a first sealing layer 14a positioned between the solar cell 12 and the front substrate 16 and a second sealing layer 14b positioned between the solar cell 12 and the back substrate 18, the second sealing layer 14b being laminated to the first sealing layer 14a. The sealing layer 14 seals the solar cell 12 while wrapping the solar cell 12 to block intrusion of moisture or oxygen which may adversely affect the solar cell 12. The components (i.e. the front substrate 16, the solar cell 12, and the back substrate 18) constituting the solar cell module 100 are chemically coupled to one another. The back substrate 18, the second sealing layer 14b, the solar cell 12 or the solar cell string, the first sealing layer 14a, and the front substrate 16 may be sequentially stacked, and then heat and/or pressure may be applied to the stacked parts such that the stacked parts can be laminated. As a result, the stacked parts may be integrated.

The first sealing layer 14a and the second sealing layer 14b may be formed of ethylene vinyl acetate copolymer resin (EVA), polyvinyl butyral, silicon resin, ester resin, or olefin resin. The first sealing layer 14a and the second sealing layer 14b may be formed of the same material or different materials. However, the invention is not limited thereto. The first sealing layer 14a and the second sealing layer 14b may be formed of various other materials. In addition, the first sealing layer 14a and the second sealing layer 14b may be formed using various methods other than lamination.

The front substrate 16 is positioned on the first sealing layer 14a to constitute the front surface of the solar cell panel 10. The front substrate 16 may be formed of a material exhibiting a sufficient strength to protect the solar cell 12 from external impact and capable of transmitting light, such as solar light, i.e. exhibiting light transmissibility. For example, the front substrate 16 may be formed of a glass substrate. In this case, the front substrate 16 may be formed of a tempered glass substrate so as to improve strength. In addition, the front substrate 16 may be formed of various other materials capable of improving various properties. Alternatively, the front substrate 16 may be a sheet or film formed of resin. That is, the material of the front substrate 16 is not particularly restricted. In addition, the front substrate 16 may be formed of various other materials.

The back substrate 18 is a layer positioned on the second sealing layer 14b for protecting the solar cell 12 at the back surface of the solar cell 12. The back substrate 18 may have waterproofing, insulating, and ultraviolet blocking functions or characteristics.

The back substrate 18 may exhibit sufficient strength to protect the solar cell 12 from external impact. In addition, the back substrate 18 may transmit or reflect light based on a desired structure of the solar cell panel 10. For example, in a structure in which light is transmitted through the back substrate 18, the back substrate 18 may be formed of a transmissive material. On the other hand, in a structure in which light is reflected by the back substrate 18, the back substrate 18 may be formed of a non-transmissive material or a reflective material. For example, the back substrate 18 may be formed in the shape of a glass substrate. Alternatively, the back substrate 18 may be formed in the shape of a film or a sheet. The back substrate 18 may be formed of tedlar/PET/tedlar (TPT) or polyvinylidene fluoride (PVDF) resin provided on at least one surface of polyethylene terephthalate (PET). Since polyvinylidene fluoride is a copolymer having a structure of $(CH_2CF_2)n$, i.e. a double fluorine molecular structure, the polyvinylidene fluoride exhibits high mechanical properties, weather resistance, and ultraviolet resistance. However, the material of the back substrate 18 is not particularly restricted.

In order to stably fix the solar cell panel 10 including the layers as described above, the frame 20 fixes the edge of the solar cell panel 10. In the figures, the entirety of the edge of the solar cell panel 10 is illustrated as being fixed by the frame 20. However, the invention is not limited thereto. For example, the frame 20 may fix only a portion of the edge of the solar cell panel 10. Various other modifications are also possible.

In this embodiment of the invention, the frame 20 may include a panel insertion unit 22, into which at least a portion of the solar cell panel 10 is inserted, and an extension unit 24 extending outward from the panel insertion unit 22.

More specifically, the panel insertion unit 22 may include a front part 222 positioned at the front surface of the solar cell panel 10, a side part 224 positioned at the side surface of the solar cell panel 10, and a back part 226 positioned at the back surface of the solar cell panel 10. The front part 222, the side part 224, and the back part 226 are connected to each other such that the edge of the solar cell panel 10 can be positioned in a space defined by the front part 222, the side part 224, and the back part 226. For example, the panel insertion unit 22 may be bent twice into a "[" shape or a "U" shape in sections such that the edge of the solar cell panel 10 can be positioned in a space defined by the panel insertion unit 22. However, the invention is not limited thereto. For example, any one or a portion of the front part 222, the side part 224, and the back part 226 may not be provided. Various other modifications are also possible.

The extension unit 24 extending rearward from the panel insertion unit 22 may include a first part 242 extending rearward from the panel insertion unit 22 in parallel to the side part 224 (or along the same plane as the side part 224) and a second part 244 extending from the first part 242 while being bent such that the second part 244 is spaced apart from the back surface of the solar cell panel 10 or the back part 226 by a predetermined distance. The second part 244 may be parallel to or inclined with respect to the back surface of the solar cell panel 10 or the back part 226. Consequently, the extension unit 24 may be bent once into a "└ " shape or an "L" shape such that a space is defined between the extension unit 24 and the back part 226.

The extension unit 24 is a part connected to a stand, a support member, or a bottom while increasing the strength of the frame 20. The second part 244 may be provided with holes, through which fastening members are inserted to fasten the extension unit 24 to the stand, the support member, or the bottom. Since the fastening members are fastened to the second part 244, which is spaced apart from the solar cell panel 10, as described above, it is possible to prevent damage to the solar cell panel 10 during installation of the solar cell module 100 using the fastening members.

The second part 244 may have an area (or a width) equal to or greater than that of the back part 226 in order to stably fix the fastening members. The fastening members may be configured to have various conventional structures. However, the invention is not limited thereto. The shape of the extension unit 24 may be variously changed.

The frame 20 may be fixed to the solar cell panel 10 using various methods. For example, the edge of the solar cell panel 10 may be formed of a material (e.g. tape) exhibiting high elasticity such that the solar cell panel 10 can be elastically inserted into the panel insertion unit 22. However, the invention is not limited thereto. For example, the components constituting the frame 20 may be coupled to the edge of the solar cell panel 10 by assembly. Various other modifications are also possible.

In this embodiment of the invention, the integrated type inverter 30 may be connected to the solar cell 12 of the solar cell panel 10. For example, the integrated type inverter 30 may be positioned at the back surface of the solar cell panel 10.

The integrated type inverter 30 according to this embodiment of the invention is constituted by at least a portion of a conventional junction box and at least a portion of an inverter, which are integrated. The integrated type inverter 30 may be named a junction box integrated type inverter, a bypass diode integrated type inverter, an integrated type junction box, or an inverter integrated type junction box. Hereinafter, the integrated type inverter 30 will be described in more detail with reference to FIGS. 4 to 8 as well as FIGS. 1 to 3.

Figure 4:
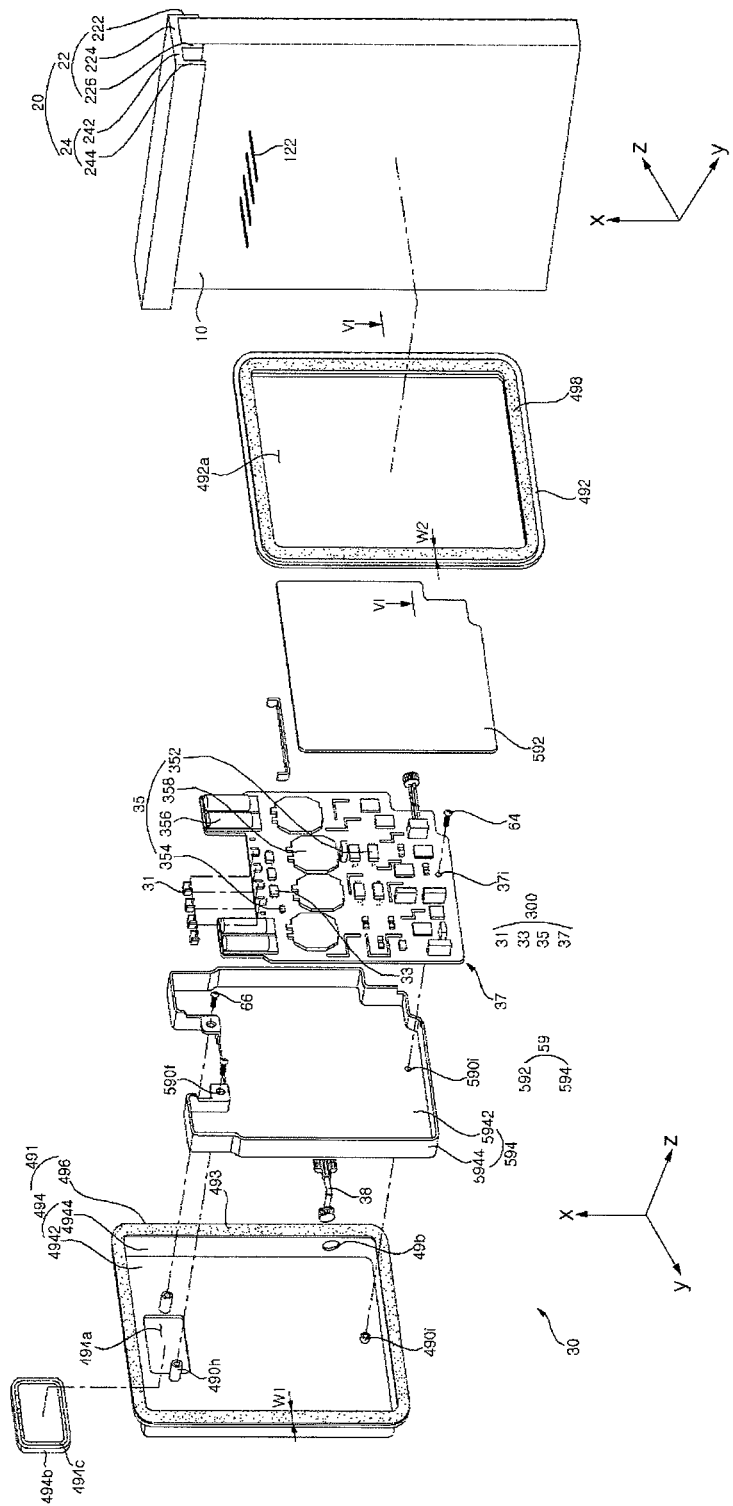
FIG. 4 is an enlarged exploded perspective view showing part A of FIG. 2.
Figure 5:
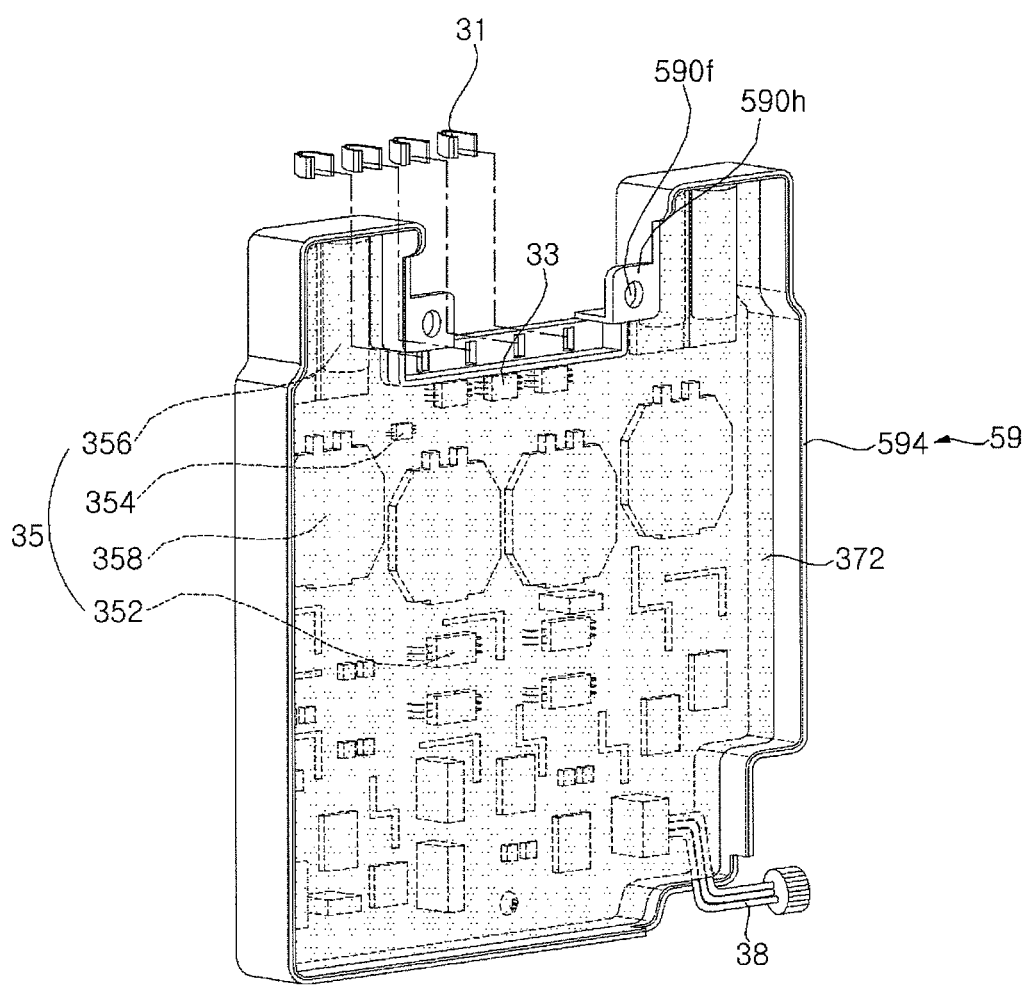
FIG. 5 is a partial perspective view showing an integrated type inverter shown in FIG. 1.

FIG. 4 is an enlarged exploded perspective view showing part A of FIG. 2, and FIG. 5 is a perspective view showing a portion of the integrated type inverter 30 shown in FIG. 1. For simplicity and clarity, a potting member 372 is omitted from FIG. 4. The potting member 372 will be described in detail with reference to FIG. 5.

Referring to FIGS. 4 and 5, the integrated type inverter 30 according to this embodiment of the invention includes a circuit unit 300 including terminals 31 connected to the solar cells 12 (see FIG. 3) or the solar cell panel 10 and an inverter member 35 including DC-AC inverters 352. The circuit unit 300 is positioned in a receiving unit 491, at least one surface of which is open. One of the open surfaces of the receiving unit 491 may be covered by the solar cell panel 10. The circuit unit 300 may further include bypass diodes 33 positioned respectively between the terminals 31 and the DC-AC inverters 352 for electrically connecting the terminals 31 and the DC-AC inverters 352 and a circuit board 37 on which the terminals 31, the bypass diodes 33, and the inverter member 35 are positioned.

In this embodiment of the invention, the terminals 31 and/or the bypass diodes 33 and the inverter member 35 are integrated.

Integration means that a plurality of components is recognized as a single part, article, object, or member when the components are fixed to the solar cell panel 10 and/or the frame 20 during installation or after installation. For example, integration may mean that a plurality of components are positioned together in the same receiving unit or the same case such that the components are integrated by the same case, that the components are fitted into or fixed to the same member such that the components are integrated by the same member, that the components are integrally formed at the same member such that the components constitute a portion of the same member, or that the components are wrapped or fixed by the same member. On the other hand, integration may not mean that a plurality of components is connected to each other via an additional output cable. The terminals 31, the bypass diodes 33, and the inverter member 35 may be integrated such that the terminals 31, the bypass diodes 33, and the inverter member 35 cannot be separated from each other. Alternatively, the terminals 31, the bypass diodes 33, and the inverter member 35 may be integrated such that the terminals 31, the bypass diodes 33, and the inverter member 35 can be separated from each other for repair or replacement.

In the integrated type inverter 30 according to this embodiment of the invention, the terminals 31, the bypass diodes 33, and the inverter member 35 are formed together on the circuit board 37, which has circuit patterns (or circuit wires). Consequently, the terminals 31, the bypass diodes 33, and the inverter member 35 may be integrated by the circuit board 37. In addition, as shown in FIG. 5, a potting member 372 may cover or wrap the circuit board 37. In this instance, the bypass diodes 33 and the inverter member 35 may be integrated by the potting member 372. The circuit board 37, on which the terminals 31, the bypass diodes 33, and the inverter member 35 are formed, may be positioned in the same receiving unit 491 and/or an inner case 59. In this instance, the terminals 31, the bypass diodes 33, and the inverter member 35 may be integrated by the same receiving unit 491 or the inner case 59.

In this embodiment of the invention, the terminals 31, the bypass diodes 33, and the inverter member 35 are integrated by the same circuit board 37, the same portion member 372, the same inner case 59, and the same receiving unit 491. More specifically, the terminals 31, the bypass diodes 33, and the inverter member 35 are positioned on the same circuit board 37, and the potting member 372 covers the bypass diodes 33, the inverter member 35, and the circuit board 37. Consequently, the terminals 31, the bypass diodes 33, the circuit board 37, and the potting member 372 are integrated to constitute the circuit unit 300. The circuit unit 300 may be fixed in the receiving unit 491 and/or the inner case 59. As a result, the terminals 31, the bypass diodes 33, and the inverter member 35 may be integrated more securely and stably. However, the invention is not limited thereto. The terminals 31, the bypass diodes 33, and the inverter member 35 may be integrated in a simple structure using at least one of the methods that are capable of achieving integration thereamong. In this embodiment of the invention, the terminals 31, the bypass diodes 33, and the inverter member 35 are integrated. However, the invention is not limited thereto. For example, only the terminals 31 and the inverter member 35 may be integrated in a state in which the bypass diodes 33 are not provided, or only the bypass diodes 33 and the inverter member 35 may be integrated. Various other modifications are also possible.

The receiving unit 491 may provide a space in which the circuit unit 300 is positioned. The receiving unit 491 may have various structures and shapes in which the receiving unit 491 can be stably fixed to the solar cell panel 100. The receiving unit 491 may have a space for receiving the circuit unit 300 and/or the inner case 59 in a state in which at least one surface of the receiving unit 491 is fully open such that the circuit unit 300 and/or the inner case 59 can be easily inserted into or removed from the receiving unit 491.

For example, in this embodiment of the invention, the receiving unit 491 may include an inner space part 494 having an inner space defined by a bottom surface 4942 and a side surface 4944 and a bonding flange 496 extending from the upper end of the inner space part 494 such that the bonding flange 496 is parallel to or inclined with respect to the bottom surface 4942. In this embodiment of the invention, the side surface 4944 is formed along all edges of the bottom surface 4942 such that only one surface of the inner space part 494 is fully open. For example, in an instance in which the bottom surface 4942 has a quadrangular shape, four side surfaces 4944 may extend from four edges of the quadrangular bottom surface 4942 such that only one surface (a surface at which the bonding flange 496 is positioned) of a rectangular parallelepiped shape is fully open. In an example, the inner space part 494 may have a structure in which at least five surfaces are provided while only one surface is open. In an instance in which only one surface of the receiving unit 491 is open as described above, the open surface of the receiving unit 491 may be covered by the solar cell panel 10 such that the interior of the receiving unit 491 can be easily sealed. However, the invention is not limited thereto. For example, two or more surfaces of the receiving unit 491 may be fully open.

In the figure, the bottom surface 4942 may have a shape defined by four straight lines in a state in which a round corner is formed at an intersection of each two neighboring straight lines. For example, the bottom surface 4942 may have an approximately quadrangular shape in a state in which four corners of the quadrangular shape are round. The side surface 4944 may be continuously formed along the entirety of the edge of the bottom surface 4942 such that the side surface 4944 intersects the bottom surface 4942 (e.g. the side surface 4944 is perpendicular to the bottom surface 4942). Consequently, the side surface 4944 may include four flat surfaces corresponding to the four straight lines and four round surfaces between all of the two neighboring flat surfaces. As a result, it is possible to sufficiently secure the inner space of the inner space part 494 and to prevent a user from being injured due to sharp corners of the inner space part 494. However, the invention is not limited thereto. The shape of the bottom surface 4942 and the side surface 4944 may be variously changed.

The bonding flange 496 may be bent from the side surface 4944. The bonding flange 496 may have a region to which a first bonding member 493 is applied such that the receiving unit 491 can be fixed to the solar cell panel 10 (more specifically, a guide member 492 fixed to the solar cell panel 10) by the first bonding member 493. The bonding flange 496 may extend outward while being bent from the entirety of the end of the side surface 4944 such that the inner space of the inner space part 494 is fully open, and therefore the circuit unit 300 can be easily inserted into or removed from the inner space part 494 without interference with the bonding flange 496. The bonding flange 496 may have a flat surface parallel to the bottom surface 4942 and/or a flat surface perpendicular to the side surface 4944. As a result, the first bonding member 493 may be stably applied to the bonding flange 496. However, the invention is not limited thereto.

In this embodiment of the invention, the bonding flange 496 extends from the entirety of the end of the side surface 4944 such that the bonding flange 496 is continuously formed to close the interior of the inner space part 494 when viewed in a plan view. The bonding flange 496 may have a flat surface positioned on the same plane. Consequently, the bonding flange 496 may be stably adhered to the solar cell panel 10 by the first bonding member 493 applied to the bonding flange 496, thereby highly maintaining airtightness of the receiving unit 491. The width of the bonding flange 496 may be uniform such that the first bonding member 493 can be uniformly applied to the bonding flange 496, thereby further improving bonding stability between the bonding flange 496 and the solar cell panel 10. However, the invention is not limited thereto. The width of the bonding flange 496 may be variously changed.

The receiving unit 491 is fixed to the solar cell panel 10 in a state in which the bonding flange 496 is adjacent to the solar cell panel 10. That is, the bottom surface 4942 of the receiving unit 491 may be distant from the solar cell panel 10, and the side surface 4944 of the receiving unit 491 may extend toward the solar cell panel 10 such that the bottom surface 4942 can be spaced apart from the solar cell panel 10 by at least the height of the side surface 4944. Consequently, the bottom surface 4942 and the side surface 4944 of the receiving unit 491 constitute the external shape or the outer surface of the integrated type inverter 30, and the receiving unit 491 is fixed in a state in which the open surface (the surface at which the bonding flange 496 is positioned) of the receiving unit 491 is covered by the solar cell panel 10. In a state in which the bonding flange 496 is fixed to the solar cell panel 10, therefore, the circuit unit 300 and/or the inner case 59 positioned in the inner space part 494 are stably fixed between the receiving unit 491 and the solar cell panel 10.

Consequently, the circuit unit 300 may be stably protected. In addition, in an instance in which it is necessary or desired to repair or replace the circuit unit 300, the receiving unit 491 may be separated from the solar cell panel 10 such that the circuit unit 300 positioned in the receiving unit 491 can be easily repaired or replaced. As described above, in this embodiment of the invention, no additional cover part for covering the open surface of the receiving unit 491 is provided but the open surface of the receiving unit 491 is covered by the solar cell panel 10. Consequently, it is possible to simplify the structure of the integrated type inverter 30, to reduce the thickness of the integrated type inverter 30 by a thickness of the cover part, and to reduce the quantity of the material used for the receiving unit 491, thereby reducing manufacturing cost of the integrated type inverter 30.

At the bottom surface 4942 of the receiving unit 491 may be formed an opening 494a corresponding to the terminals 31. The opening 494a may be covered by a cover part 494b. The opening 494a is provided to expose a portion of the circuit board 37 at which the terminals 31 are positioned such that ribbons 122 can be easily fixed to the terminals 31 in a state in which the integrated type inverter 30 or the receiving unit 491 is fixed to the solar cell panel 10. The cover part 494b is provided to cover the opening 494a after the ribbons 122 are fixed to the terminals 31. In an instance in which the opening 494a having a smaller area than the bottom surface 4942 and the cover part 494b are provided as described above, the ribbons 122 may be easily fixed to the terminals 31 after the integrated type inverter 30 is fixed to the solar cell panel 10. In addition, in an instance in which the ribbons 122 are broken or not properly fixed to the terminals 31, it is possible to repair the ribbons 122 in a state in which only the cover part 494b is separated from the integrated type inverter 30. Consequently, workability may be improved during repair of the integrated type inverter 30.

The opening 494a may have a sufficient size and shape to expose the portion of the circuit board 37 at which the terminals 31 are formed, and the cover part 494b may have a sufficient size and shape to cover the opening 494a. For example, the opening 494a may have a size less than that of the open surface of the receiving unit 491 such that the receiving unit 491 has sufficient strength and, on the other hand, have a size greater than that of the portion of the circuit board 37 at which the terminals 31 are positioned such that the portion of the circuit board 37 at which the terminals 31 are positioned can be exposed. The cover part 494b may have a larger size than the opening 494a such that the edge of the cover part 494b can overlap the bottom surface 4942 around the opening 494a and thus can be easily adhered to the bottom surface 4942. The cover part 494b may be formed of various materials suitable for covering the opening 494a. The cover part 494b may be formed of a material identical to or different from the material of the receiving unit 491. In addition, the cover part 494b may have a smaller area than the bottom surface 4942 of the receiving unit 491, thereby reducing manufacturing cost of the cover part 494b.

Between the opening 494a and the cover part 494b may be positioned an adhesive member 494c for improving airtightness, sealing, and waterproofing properties of the receiving unit 491. More specifically, the adhesive member 494c may be formed such that the adhesive member 494c has a closed space defined therein while surrounding the opening 494a of the receiving unit 491 when viewed in a plan view. As a result, a space defined between the solar cell panel 10 and the receiving unit 491 may be effectively partitioned and separated from a space outside the integrated type inverter 30 in a state in which the cover part 494b is stably positioned on the bottom surface 4942 of the receiving unit 491. Consequently, it is possible to seal the receiving unit 491 having the opening 494a.

For example, the adhesive member 494c may have various shapes, such as a circular shape and a polygonal shape, when viewed in a plan view. In the figure, the opening 494a has a quadrangular shape, and the adhesive member 494c has a quadrangular shape. However, the invention is not limited thereto. The adhesive member 494c may have various structures and shapes that are capable of sealing the cover part 494b and, in addition, interrupting communication between the inside and the outside of the receiving unit 491.

In this embodiment of the invention, the opening 494a is provided at the integrated type inverter 30 such that connection between the ribbons 122 and the terminals 31 can be carried out through the opening 494a. For this reason, the adhesive member 494c is provided to improve an airtightness property of the integrated type inverter 30. On the other hand, a conventional inverter is not provided with an opening used for connection with the solar calls 12.

The adhesive member 494c may be formed of various materials exhibiting high adhesive and sealing properties. For example, a sealant may be used as the adhesive member 494c. However, the invention is not limited thereto. For example, the adhesive member 494c may be a structure formed of resin or metal, which may be heated to achieve adhesion between the bottom surface 4942 and the cover part 494c. Various other modifications are also possible. In addition, it is possible to more securely fix the bottom surface 4942 and the cover part 494c using an additional structure (e.g. a screw engagement structure, a latch structure, a packing structure, a hinge structure, or a fitting structure) together with the adhesive member 494c. Various other modifications are also possible. The receiving unit 491 may include a structure for connection with the solar cells 12, an external device (e.g. another solar cell module 100 or a power network), etc. That is, the ribbons 122 extending to the back surface of the solar cell panel 10 may reach the circuit unit 300 (specifically, the terminals 31) through the open surface of the receiving unit 491. In addition, the receiving unit 491 may include a through hole 49b, through which an AC output cable 38 for transmitting AC current (or AC voltage or AC power) generated by the integrated type inverter 30 extends.

That is, the open surface of the receiving unit 491 for connection with the solar cells 12 and the through hole 49b for the AC output cable 38 are formed together at the same receiving unit 491. This is because the terminals 31 and/or the bypass diodes 33 and the inverter member 35 are integrated. Conventionally, an opening, an open surface, or a through hole for connection with the solar cells is formed at a case of the junction box, and an opening, an open surface, or a through hole for the AC output cable is formed at a case of the inverter at which the inverter member is positioned. For this reason, they cannot be formed at the same case. In this embodiment of the invention, on the other hand, the structure for connection with the solar cell panel 10 and the AC output cable 38 for supplying AC voltage to an external device may be integrated by the circuit board 37.

For example, the open surface of the receiving unit 491 may be positioned at a surface (i.e. a surface at which the bonding flange 496 is positioned) of the receiving unit 491 adjacent to the solar cell panel 10. The through hole 49b may be formed at a position of the receiving unit 491 at which external circuit connection can be easily achieved. For example, in this embodiment of the invention, the through hole 49b may be formed at the side surface 4944 spaced apart from the terminals 31 such that voltage provided from the solar cell panel 10 to the terminals 31 can sequentially pass through the bypass diodes 33 and the inverter member 35 and then be output to an external device via the AC output cable 38. As a result, the terminals 31, the bypass diodes 33 and the inverter member 35 may be efficiently disposed.

In this embodiment of the invention, the output cable of the integrated type inverter 30, at which the terminals 31 connected to the ribbons 122 and/or the bypass diodes 33 are positioned, is constituted by an AC output cable 38. Consequently, the AC output cable 38 may extend outward through the through hole 49b. In general, an AC output cable 38 may include three wires having three phase voltage (current). That is, one AC output cable 38 includes three wires. Three wires constituting one AC output cable 38 may be combined such that the three wires can extend through one through hole 49b. As a result, the structure of the integrated type inverter 30 may be simplified. However, the invention is not limited thereto. For example, the three wires may extend through different holes 49b.

In this embodiment of the invention, the output cable of the integrated type inverter 30, at which the terminals 31 connected to the ribbons 122 and/or the bypass diodes 33 are positioned, is constituted by an AC output cable 38, and no DC output cable is provided. This is because the terminals 31 and/or the bypass diodes 33 and the inverter member 35 are integrated. Conventionally, DC voltage or DC current is output from the junction box at which the terminals and the bypass diodes are located. For this reason, two DC output cables, such as a positive (+) output cable and a negative (−) output cable, are provided.

The receiving unit 491 may be formed of various materials that are capable of retaining external shape or edge thereof and protecting various parts, articles, and members positioned therein. For example, the receiving unit 491 may be formed of various materials, such as resin, metal, and surface-treated metal (or coated metal). In an instance in which the receiving unit 491 is formed of resin, it is possible to improve an insulation property of the receiving unit 491 and to reduce manufacturing cost of the receiving unit 491. In an instance in which the receiving unit 491 is formed of metal, it is possible to improve structural stability of the receiving unit 491. In addition, the receiving unit 491 may be used for grounding. In an instance in which the receiving unit 491 is formed of surface-treated metal (or coated metal), a conductive material layer may be positioned in the receiving unit 491, and a surface-treated layer exhibiting an insulation property may be positioned outside the receiving unit 491 in a state in which the surface-treated layer wraps the conductive material layer. In this instance, corrosion resistance of the receiving unit 491 may be improved while the receiving unit 491 has an improved appearance due to the surface-treated layer exhibiting the insulation property, and the conductive material layer positioned in the receiving unit 491 may be used for grounding.

For example, the receiving unit 491 may be formed of anodized metal (e.g. anodized aluminum). In this instance, the receiving unit 491 may include a conductive material layer containing aluminum and a surface-treated layer containing an aluminum oxide. In addition, the color of the receiving unit 491 may also be adjusted during surface treatment (e.g. anodizing) such that the receiving unit 491 has a further improved appearance. For example, the color of the receiving unit 491 may be adjusted during surface treatment (e.g. anodizing) such that the receiving unit 491 can be colored black, brown, or silver, for example.

In this embodiment of the invention, a guide member 492 having a shape corresponding to the bonding flange 496 may be positioned between the bonding flange 496 and the solar cell panel 10. As a result, the first bonding member 493 may be positioned between the bonding flange 496 and the guide member 492 (e.g. in contact) for bonding the bonding flange 496 and the guide member 492. The first bonding member 493 may seal a space defined between the bonding flange 496 of the receiving unit 491 and the guide member 492 by bonding to prevent introduction of external foreign matter and contaminant and to improve sealing and waterproofing properties. The first bonding member 493 may be formed of various materials exhibiting bonding and/or sealing properties. For example, a sealant may be used as the first bonding member 493. However, the invention is not limited thereto.

The bonding flange 496 and the guide member 492 may entirely overlap each other (i.e. the entirety of the bonding flange 496 may be placed on the guide member 492). The guide member 492 may have a width equal to or greater than that of the bonding flange 496. That is, the guide member 492 may have a width equal to or greater than that of the bonding flange 496 while having a shape identical to or very similar to that of the bonding flange 496.

For example, a ratio of a width W1 of the bonding flange 496:a width W2 of the guide member 492 (W1:W2) may be 1:1 to 1:10.

If the ratio (W1:W2) is less than 1:1, the entirety of the bonding flange 496 may not be placed on the guide member 492. On the other hand, if the ratio (W1:W2) is greater than 1:10, the width of the guide member 492 may be increased with the result that material cost may be increased, and a space occupied by the integrated type inverter 30 may be unnecessarily increased. In consideration of the material cost and the space occupied by the integrated type inverter 30, the ratio (W1:W2) may be 1:1 to 1:5. However, the invention is not limited thereto. The ratio (W1:W2) may be variously changed.

In this embodiment of the invention, the guide member 492 has a shape corresponding to the bonding flange 496. Consequently, the guide member 492 has a shape continuously formed to have a closed inner space (e.g. an opening 492a) corresponding to the inner space part 494 when viewed in a plan view. As a result, the bonding flange 496 may be stably located on the guide member 492 in a state in which the area of the guide member 492 is minimized. In addition, the ribbons 122 extending to the back surface of the solar cell panel 10 may be connected to the circuit unit 300 in the receiving unit 491 through the opening 492a.

Consequently, the guide member 492 may be formed to surround the ribbons 122. On the other hand, the guide member 492 may not have a shape corresponding to the bonding flange 496. The opening 492*a* may be formed only at a portion of the guide member 492 corresponding to the ribbons 122 in a state in which the bonding flange 496 and the guide member 492 entirely overlap each other. Various other modifications are also possible.

In an instance in which the bonding flange 496 is entirely positioned on the guide member 492 in a state in which the first bonding member 493 is disposed between the bonding flange 496 and the guide member 492 as described above, the bonding flange 496 may be further spaced apart from the solar cell panel 10 than in an instance in which the guide member 492 is not provided. In an instance in which repair or replacement is needed or desired, therefore, a cutting tool (e.g. a knife) may be moved along the bonding flange 496 in a state in which the cutting tool is put between the bonding flange 496 and the guide member 492 to cut the first bonding member 493 such that the bonding flange 496 can be easily separated from the guide member 492. That is, the cutting tool may be moved along the flat surface of the bonding flange 496 in a state in which the bonding flange 496 is further spaced apart from the solar cell panel 10 such that the receiving unit 491 can be easily separated from the solar cell panel and the guide member 492. When the cutting tool is used, the cutting tool is not positioned adjacent to the solar cell panel 10 but is positioned adjacent to the guide member 492, thereby preventing damage to the solar cell panel 10. In addition, the bonding flange 496 may be positioned such that the bonding flange 496 does not deviate from the guide member 492 to approximately align the position of the receiving unit 491. Consequently, the guide member 492 may be used as an alignment mark of the bonding flange 496.

The guide member 492 may have a generally uniform thickness such that a surface of the guide member 492 opposite to the flat surface of the bonding flange 496 is flat. As a result, the distance between the opposite surfaces of the bonding flange 496 and the guide member 492 may be uniform, and the first bonding member 493 disposed between the bonding flange 496 and the guide member 492 may have a generally uniform thickness. Consequently, bonding between the guide member 492 and the bonding flange 496 may be stably achieved by the provision of the first bonding member 493.

Figure 6:
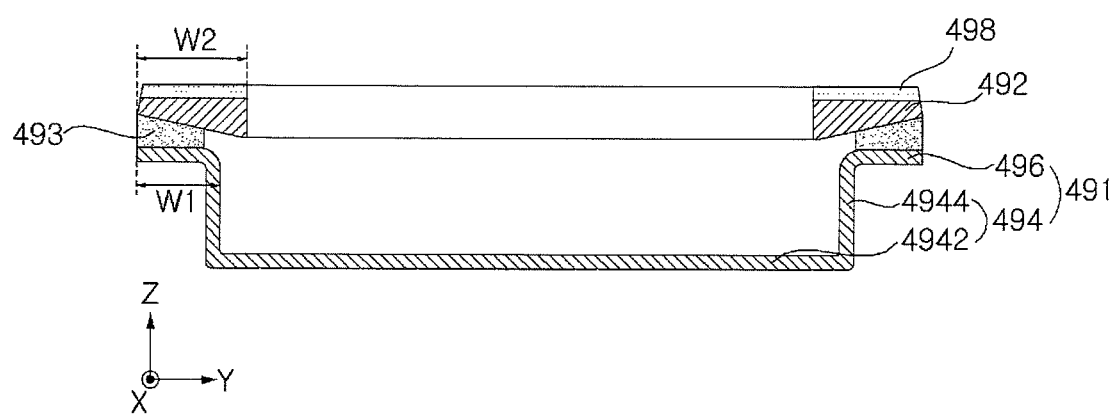
FIG. 6 is a sectional view taken along line VI-VI of FIG. 4.

However, the invention is not limited thereto. In another example, a modification as shown in FIG. 6 is also possible. FIG. 6 is a sectional view taken along line VI-VI of FIG. 4. As shown in FIG. 6, the distance between the opposite surfaces of the guide member 492 and the bonding flange 496 at inner edges thereof may be different from that between the opposite surfaces of the guide member 492 and the bonding flange 496 at outer edges thereof. Specifically, as shown in FIG. 6, the distance between the opposite surfaces of the guide member 492 and the bonding flange 496 at the outer edges thereof may be greater than that between the opposite surfaces of the guide member 492 and the bonding flange 496 at the inner edges thereof. For example, the thickness of the guide member 492 may be gradually decreased from the inner edge to the outer edge thereof such that the surface of the guide member 492 opposite to the bonding flange 496 is inclined with respect to the bonding flange 496. As a result, the distance between the bonding flange 496 and the guide member 492 at the outer edge of the bonding flange 496 may be relatively large. When the receiving unit 491 is separated from the solar cell panel 10 and the guide member 492 using the cutting tool, therefore, the cutting tool may be easily put between the bonding flange 496 and the guide member 492 to cut the first bonding member 493. However, the invention is not limited thereto. The shape of the guide member 492 may be variously changed.

The guide member 492 may be formed of various materials. For example, the guide member 492 may be formed of various materials, such as resin, metal, and surface-treated metal (or coated metal). In an instance in which the guide member 492 is formed of resin, it is possible to improve an insulation property of the guide member 492 and to reduce manufacturing cost of guide member 492. On the other hand, in an instance in which the guide member 492 is formed of metal, it is possible to improve structural stability of the guide member 492. However, the invention is not limited thereto.

The guide member 492 may be fixed to the solar cell panel 10 using various methods and structures. For example, a second bonding member 498 may be positioned between the guide member 492 and the solar cell panel 10 (e.g. in contact) for bonding the guide member 492 and the solar cell panel 10. The second bonding member 498 may seal a space defined between the guide member 492 and the solar cell panel 10 by bonding to prevent introduction of external foreign matter and contaminant and to improve sealing and waterproofing properties. The second bonding member 498 may be formed of various materials exhibiting bonding and/or sealing properties. For example, a sealant may be used as the second bonding member 498. However, the invention is not limited thereto.

The first and second bonding members 493 and 498 may be continuously formed along the bonding flange 496 or the guide member 492 to have a closed space therein when viewed in a plan view. Consequently, it is possible to partition and separate the inner space part 494 of the receiving unit 491 from a space outside the integrated type inverter 30, while stably fixing the receiving unit 491 to the solar cell panel 10, thereby effectively sealing the inner space part 494. For example, the first and second bonding members 493 and 498 may each have various shapes, such as a circular shape and a polygonal shape, corresponding to the bonding flange 496 or the guide member 492 when viewed in a plan view. In the figure, the bonding flange 496 and the guide member 492 are illustrated as having an approximately quadrangular shape, and the first and second bonding members 493 and 498 are illustrated as having an approximately quadrangular shape. However, the invention is not limited thereto. The first and second bonding members 493 and 498 may have various structures and shapes.

In this embodiment of the invention, in a state in which the guide member 492 is positioned between the solar cell panel 10 and the receiving unit 491 (specifically, the bonding flange 496), the guide member 492 and the bonding flange 496 are bonded to each other by the first bonding member 493, and the guide member 492 and the solar cell panel 10 are bonded to each other by the first bonding member 493. As described above, the receiving unit 491 is bonded to the solar cell panel 10 through a double sealing structure including the two bonding members, i.e. the first and second bonding members 493 and 498. The double sealing structure may function to absorb shock between the solar cell panel 10 and the receiving unit 491 due to an external force (e.g. wind or snow). Particularly, in an instance in which the receiving unit 491 is formed of a rigid material, the solar cell panel 10, which is flexible, may be damaged when the external force is applied. In this embodiment of the invention, it is possible to effectively prevent damage to the solar cell panel 10.

However, the invention is not limited thereto. For example, the bonding flange 496 may be bonded to the solar cell panel 10 in a state in which one bonding member 493 or 498 is disposed between the bonding flange 496 and the solar cell panel 10 without the provision of the guide member 492. In this instance, the structure may be simplified. Various other structures may also be applied.

In this embodiment of the invention, the inner case 59, which receives the circuit unit 300, may be positioned in the receiving unit 491. The inner case 59 may be separately fixed to the receiving unit 491 such that the circuit unit 300 received in the inner case 59 can be easily fixed to the receiving unit 491 or easily separated from the receiving unit 491.

The inner case 59 may also function to support or receive the circuit unit 300 such that the circuit unit 300 can be easily separated from the receiving unit 491. When repair or replacement is needed or desired, therefore, the receiving unit 491 may be separated from the solar cell panel 10, and then the inner case 59 may be separated from the receiving unit 491 such that the circuit unit 300 can be separated from the receiving unit 491 at once. In addition, when repair is needed or desired, the inner case 59 may be inserted into the receiving unit 491 in a state in which a circuit unit 300 for replacement is received in the inner case 59, thereby easily achieving replacement.

The inner case 59 may also function as a receiving unit for receiving the potting member 372, which wraps the circuit unit 300 including the terminals 31, the bypass diodes 33, the inverter member 35, and the circuit board 37. That is, in a state in which the terminals 31, the bypass diodes 33, and the inverter member 35 are positioned in the inner case 59, the potting member 372 may be injected or poured in a mobile state and then dried or heat-treated such that the potting member 372 is solidified. As a result, the inner case 59 and the circuit unit 300 may be integrated. Consequently, it is possible to simplify a process of applying the potting member 372 and to further strengthen the integrated structure of the circuit unit 300.

The inner case 59 may have various structures that are capable of supporting and receiving the circuit unit 300.

For example, in this embodiment of the invention, the inner case 59 may include an inner space part 594 having a bottom surface 5942 positioned at a portion thereof excluding a portion (e.g. a portion corresponding to the opening 494a) through which the ribbons 122 extends and a side surface 5944 extending from the bottom surface 5942. In an instance in which the side surface 5944 is formed along all edges of the bottom surface 5942, the inner case 59 may more effectively function as a receiving unit for receiving the potting member 372. However, the invention is not limited thereto. For example, the inner space part 594 may have the bottom surface 5942 such that the inner space part 594 have no inner space defined therein.

In addition, the inner case 59 may further include a cover part 592 for covering the top surface of the inner space part 594. The cover part 592 may be formed so as not to cover the terminals 31, i.e., so as to expose the terminals 31, such that connection between the ribbons 122 and the terminals 31 can be more easily achieved. The cover part 592 may be positioned on the circuit unit 300 without the provision of an additional adhesive or may be adhered to the circuit unit 300 using an additional adhesive (e.g. a double-sided tape). For example, the cover part 592 may be formed of resin exhibiting an insulative property or an insulative sheet. In addition, the cover part 592 may be formed of various other materials and may have various other shapes. However, the invention is not limited thereto. The cover part 592 may not be provided.

In addition, according to circumstances (in an instance in which the receiving unit 491 is conductive), the inner case 59 may function to maintain the insulation distance between the circuit patterns of the circuit board 37. In this instance, the inner case 59 may be formed of an insulative material to maintain the insulation distance between the receiving unit 491 and the circuit board 37. However, the invention is not limited thereto. Even in an instance in which the receiving unit 491 is conductive, the inner case 59 may be formed of a conductive material such that the inner case 59 exhibits conductivity. Alternatively, the inner case 59 may not be provided. In an instance in which the inner case 59 is not provided, the circuit unit 300 may be directly fixed to the receiving unit 491. In an instance in which the inner case 59 does not perform a function satisfying the insulation distance or is not provided, another structure satisfying the insulation distance may be further provided, which will hereinafter be described in more detail with reference to FIG. 7.

Figure 7:
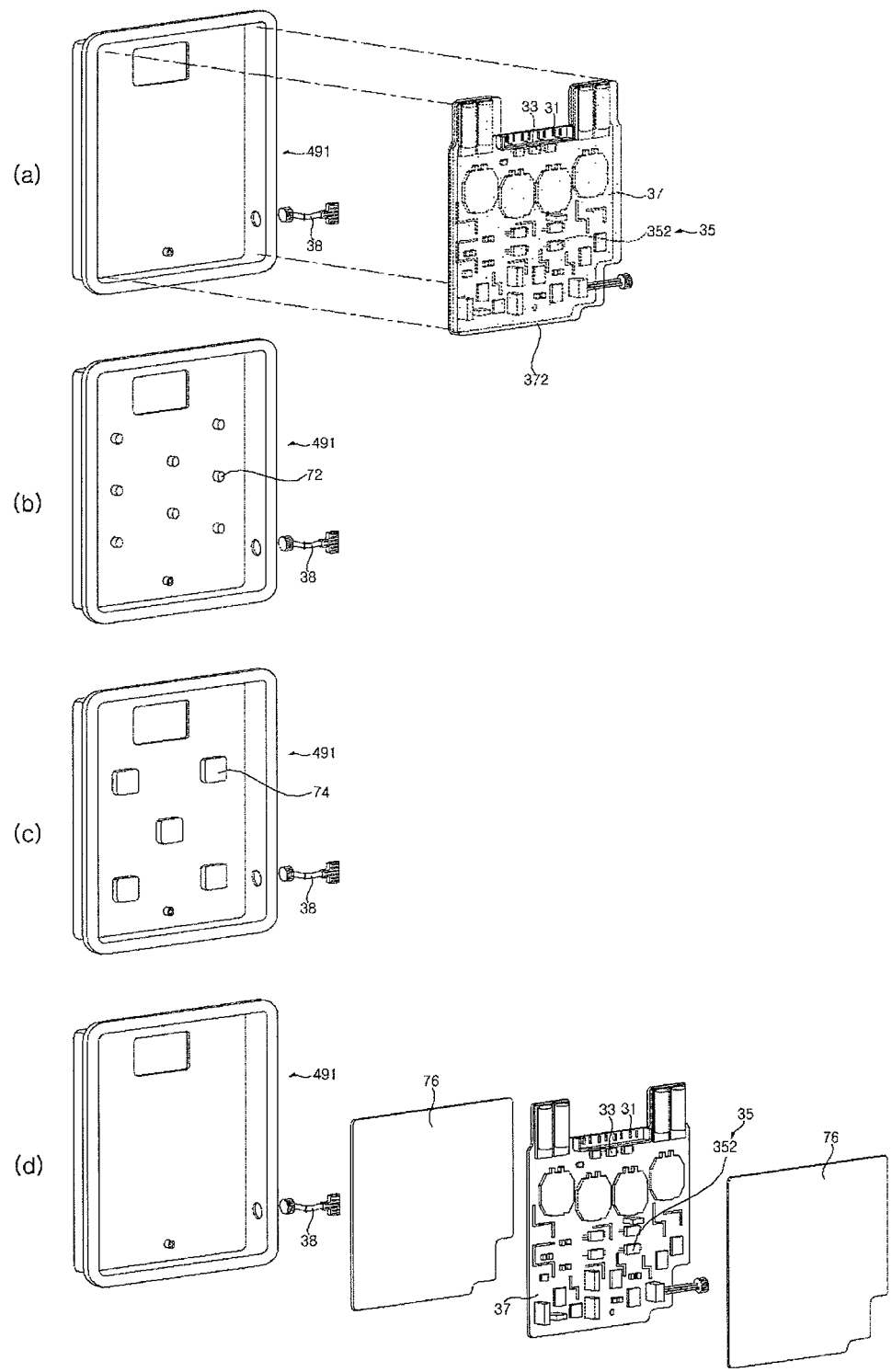
FIG. 7 is a perspective view showing various modifications of the integrated type inverter of the solar cell module of FIG. 1.

FIG. 7 is a perspective view showing various modifications of the integrated type inverter 30 of the solar cell module 100 of FIG. 1. For simplicity and clarity, only components of the integrated type inverter 30 to be described are shown in FIG. 7, and other components of the integrated type inverter 30 that are not described are omitted from FIG. 7.

For example, as shown in (a) of FIG. 7, the terminals 31, the bypass diodes 33, the inverter member 35, and the circuit board 37 may be entirely wrapped by the potting member 372 or another insulative material. In addition, the circuit wrapped by the potting member 372 or another insulative material may be positioned in the receiving unit 491 without the provision of the inner case 59. In this instance, the insulation distance may be satisfied by the potting member 372 or another insulative material although the inner case 59 is not provided.

In another example, as shown in (b) of FIG. 7, spacers 72, each of which is made of an insulative material, for maintaining a predetermined distance between the receiving unit 491 and the inner case 59 or between the receiving unit 491 and the circuit board 37 may be positioned in the receiving unit 491 (e.g. at the inside of the bottom surface 4942). In this instance, the insulation distance may be satisfied by the spacers 72. The shape and arrangement of the spacers 72 may be variously changed.

In another example, as shown in (c) of FIG. 7, insulative pads 74, each of which is made of an insulative material, may be partially positioned in the receiving unit 491 (e.g. at the inside of the bottom surface 4942).

In a further example, as shown in (d) of FIG. 7, an insulative sheet 76 may be positioned between the receiving unit 491 and the inner case 59 or between the receiving unit 491 and the circuit board 37. The insulative sheet 76 may be positioned without the provision of an additional adhesive or may be adhered to the receiving unit 491 and the circuit unit 300 using an additional adhesive (e.g. a double-sided tape). Alternatively, the receiving unit 491 may be coated or surface-treated with an insulative material to satisfy the insulation distance. Various other methods and structures may be applied.

Referring back to FIGS. 4 and 5, the inner case 59 is formed such that the inner case 59 does not cover the opening 494*a*. However, the invention is not limited thereto. Various structures in which the ribbons can be connected to the respective terminals 31)

The inner case 59 may be separately fixed to the receiving unit 491 through various structures. For example, in this embodiment of the invention, the receiving unit 491 may be provided with first swage nuts (e.g. PEM nuts) 490*h*, and the inner case 59 may be provided with fastening holes 590*f* corresponding to the first swage nuts 490*h*.

More specifically, the first swage nuts 490*h* and the fastening holes 590*f* may be positioned at opposite sides of the terminals 31, to which the ribbons 122 are connected, such that the inner case 59 can be fixed to the receiving unit 491 at a position at which the terminals 31 are positioned to minimize a gap therebetween. Consequently, the ribbons 122 may be stably fastened to the terminals 31. Fastening parts 590*h*, at which the fastening holes 590*f* are formed, may be formed at a position protruding from the bottom surface 5952 by a height corresponding to each of the first swage nuts 490*h* such that the fastening parts 590*h* can extend outward from the side surface 5944 of the inner space part 594 of the inner case 59.

The first swage nuts 490*h* may be fixed to the bottom surface 4942 of the receiving unit 491 through a caulking process. The inner case 59 may be fixed to the receiving unit 491 by inserting fastening members 66 into the first swage nuts 490*h* in a state in which the fastening holes 590*f* of the inner case 59 is positioned on the first swage nuts 490*h*. The inner case 59 may be securely fixed to the receiving unit 491 by the fastening members 66. The fastening members 66 may be unfastened to easily separate the inner case 59 from the receiving unit 491.

The receiving unit 491 may be provided at an edge thereof opposite to the first swage nuts 490*h* with a second swage nut 490*i*. The inner case 59 may be provided with a fastening hole 590*i* corresponding to the second swage nut 490*i*. In addition, the circuit board 37 (or the circuit unit 300) may be provided with a fastening hole 37*i* corresponding to the second swage nut 490*i*.

The second swage nut 490*i* may be fixed to receiving unit 491 through a caulking process. The second swage nut 490*i* may have a shape protruding from the bottom surface 4944 toward the circuit board 37. As a result, the second swage nut 490*i* may function as a spacer for supporting the circuit board 37 spaced apart from the receiving unit 491 by a predetermined distance, thereby further improving stability in fixing of the circuit board 37. The inner case 59 and the circuit board 37 may be fixed to the receiving unit 491 by inserting a fastening member 64 into the second swage nut 490*i* in a state in which the fastening hole 590*i* of the inner case 59 and the fastening hole 37*i* of the circuit board 37 are positioned on the second swage nut 490*i*. The inner case 59 and the circuit board 37 may be securely fixed to the receiving unit 491 by the fastening member 64. The fastening member 64 may be unfastened to easily separate the inner case 59 and the circuit board 37 from the receiving unit 491. In addition, in an instance in which the receiving unit 494 is formed of a conductive material, such as metal, a grounding structure may be formed by inserting the fastening member 64 into the second swage nut 490*i* through the fastening hole 37*i*.

The circuit unit 300, including the terminals 31, the bypass diodes 33, and the inverter member 35, is positioned in the inner case 59 and the receiving unit 491. In this embodiment of the invention, the terminals 31, the bypass diodes 33, and the inverter member 35 are positioned together on the circuit board 37 such that the terminals 31, the bypass diodes 33, and the inverter member 35 can be integrated by the circuit board 37. In this embodiment of the invention, therefore, the terminals, to which the ribbons 122 are connected, and the bypass diodes 33 are positioned on the circuit board 37 unlike a conventional art.

The circuit board 37 may have various circuit patterns (e.g. wires, terminals, and various parts for connection on the circuit board 37). In addition, the circuit board 37 may have various structures. For example, a printed circuit board may be used as the circuit board 37. In the figure, the terminals 31, the bypass diodes 33, and the inverter member 35 are illustrated as being positioned together on the circuit board 37, thereby simplifying the structure of the circuit board 37. However, the invention is not limited thereto. A plurality of circuit boards 37 may be provided, and the circuit boards 37 may be connected to another circuit board (e.g. a flexible printed circuit board (FPCB)) via a connector. Various other modifications are also possible.

In this embodiment of the invention, the terminals 31 and/or the bypass diodes 33 are positioned on the circuit board 37, which is different from a conventional art in which the terminals and the bypass diodes are not formed on the circuit board but are positioned in the junction box. In an instance in which the terminals 31 and/or the bypass diodes 33 are positioned on the circuit board 37 as described above, the terminals 31 and the bypass diodes 33 are connected to each other via the circuit patterns of the circuit board 37, and the bypass diodes 33 and the inverter member 35 are connected to each other via the circuit patterns of the circuit board 37, thereby simplifying the connection structure. In addition, a heat dissipation property may be improved by the provision of a metal sheet (e.g. a copper sheet) constituting the circuit board 37. In particular, the bypass diodes 33 generate a large amount of heat during driving or operation. In an instance in which the bypass diodes 33 are formed on the circuit board 37, the heat dissipation property may be greatly improved.

The terminals 31 are electrically connected to the solar cell panel 10 via the ribbons 122 extending from the solar cells 12 to transmit DV voltage or DC current generated by the solar cell panel 10 to the bypass diodes 33 and the inverter member 35.

The terminals 31, to which the ribbons 122 are connected, are adjacent to one side of the circuit board 37 (specifically, one edge of the circuit board 37 adjacent to the ribbons 122 and the opening 494*a*). Consequently, the ribbons 122 may be fixed to the terminals 31 through the opening 494*a* in a state in which the receiving unit 491 is fixed to the solar cell panel 10, which will hereinafter be described in more detail with reference to FIG. 9.

Figure 8:
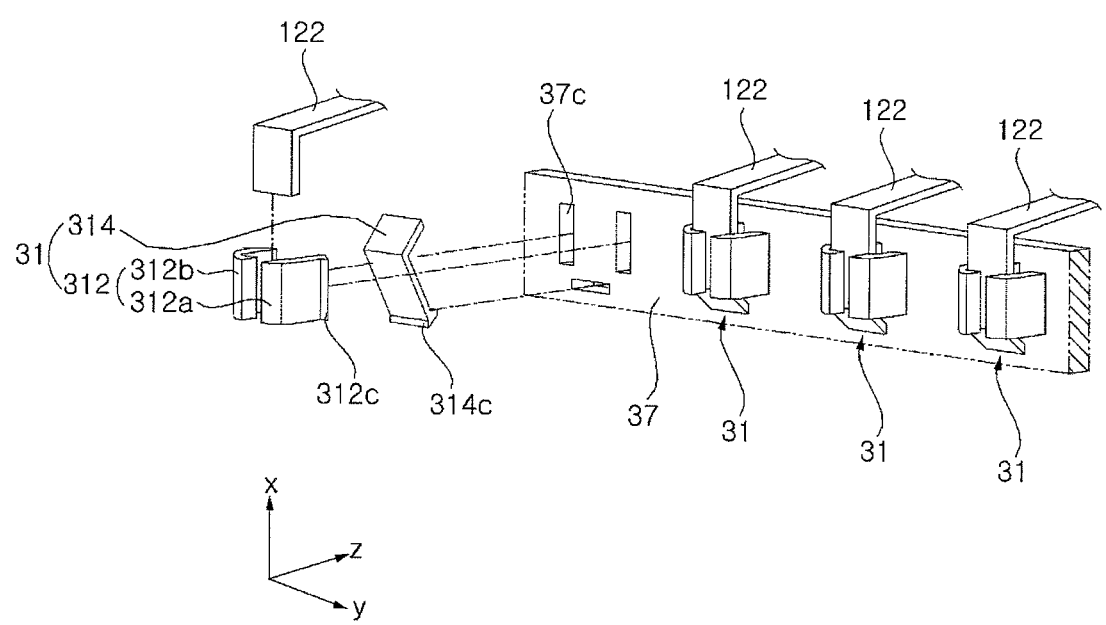
FIG. 8 is a perspective view showing terminals applicable to the integrated type inverter of the solar cell module of FIG. 1 and ribbons connected to the terminals.

Referring to FIG. 8, a plurality of terminals 31 are provided such that the terminals 31 can correspond to the ribbons 122 one to one. In this embodiment of the invention, each terminal 31 may have a structure in which a corresponding one of the ribbons 122 can be separately fixed thereto. For example, each terminal 31 may include an upper terminal part 312 positioned at the upper side of a corresponding ribbon 122 and a lower terminal part 314 positioned at the lower side of the ribbon 122. The upper terminal part 312 may include a first upper terminal part 312*a* extending to the upper part of one side of the ribbon 122 while being fixed to the circuit board 37 at one side of the ribbon 122 and a second upper terminal part 312*b* extending to the upper part of the other side of the ribbon 122 while being fixed to the circuit board 37 at the other side of the ribbon 122, the second upper terminal part 312*b* being spaced apart from the first upper terminal part 312*a*. The lower terminal part 314 positioned at the lower side of the first upper terminal part 312a and the second upper terminal part 312b may extend upward while being fixed to the circuit board 37 at a more inward position than the first upper terminal part 312a and the second upper terminal part 312b and then extend in parallel to the ribbon 122 such that the lower terminal part 314 traverses the first upper terminal part 312a and the second upper terminal part 312b. In addition, a portion of the lower terminal part 314 traversing the first upper terminal part 312a and the second upper terminal part 312b may be formed such that a middle part of the lower terminal part 314 can protrude more upward than the end of the lower terminal part 314. As a result, the middle part of the lower terminal part 314 may be more adjacent to the first upper terminal part 312a and the second upper terminal part 312b than the end of the lower terminal part 314.

When the ribbon 122 is inserted between the upper terminal part 312 and the lower terminal part 314 in a state in which a portion of the lower terminal part 314 of the terminal 31 fixed to the circuit board 37 is pushed downward to increase the distance between the upper terminal part 312 and the lower terminal part 314, and then the force applied to the lower terminal part 314 of the terminal 31 is released, the lower terminal part 314 moves toward the upper terminal part 312 with the result that the ribbon 122 is fixed between the upper terminal part 312 (specifically, the middle part of the upper terminal part 312) and the lower terminal part 314. The ribbon 122 may be separated from the terminal 31 in which the portion of the lower terminal part 314 of the terminal 31 fixed to the circuit board 37 is pushed downward to increase the distance between the upper terminal part 312 and the lower terminal part 314.

The upper terminal part 312 and the lower terminal part 314 of the terminal 31 may be fixed to the circuit board 37 using various methods. For example, latch members (or catching members) 312c and 314c may be formed at portions of the upper terminal part 312 and the lower terminal part 314 fixed to the circuit board 37 may be provided with, and catching holes 37c may be formed at corresponding positions of the circuit board 37. The terminal 31 may be easily fixed to the circuit board 37 by inserting the latch members 312c and 314c of the upper terminal part 312 and the lower terminal part 314 into the catching holes 37c of the circuit board 37. In addition, the terminal 31 may be easily separated from the circuit board 37 by drawing the latch members 312c and 314c of the upper terminal part 312 and the lower terminal part 314 out from the catching holes 37c of the circuit board 37. However, the invention is not limited thereto. The terminal 31 may be fixed to the circuit board 37 such that the terminal 31 cannot be separated from the circuit board 37. Various other modifications are also possible.

Since each terminal 31 has a structure in which a corresponding one of the ribbons 122 can be separately fixed thereto as described above, the ribbons 122 may be easily separated from the respective terminals 31 when repair or replacement is needed or desired, and then the ribbons 122 may be easily connected to the respective terminals 31. However, the invention is not limited thereto. The terminals 31 may have various structures. In addition, each terminal 31 may be formed of a metal pad or a soldering pad such that a corresponding one of the ribbons 122 can be bonded to the terminal 31 by welding or soldering. In this instance, the ribbons 122 may be fixed to the respective terminals 31 such that the ribbons 122 cannot be separated from the respective terminals 31. Consequently, it is possible to simplify the structure of the terminals 31 and to reduce manufacturing cost of the terminals 31.

Referring back to FIGS. 4 and 5, the bypass diodes 33, which are connected to the terminals 31 via circuit patterns extending from the terminals 31, are positioned on the circuit board 37. The number of the bypass diodes 33 is one less than that of the terminals 31. That is, when the number of the terminals 31 is n, the number of the bypass diodes 33 is n−1. Each bypass diode 33 may be connected between two terminals 31 via the circuit patterns. When a portion of the solar cell panel 10 is shielded or a portion of the solar cell panel 10 cannot generate electricity due to damage, the bypass diodes 33 enable current to bypass the corresponding portion of the solar cell panel 10 for protecting the corresponding portion of the solar cell panel 10. Various conventional structures may be applied to the bypass diodes 33.

In addition, the inverter member 35, which is connected to the bypass diodes 33 via circuit patterns extending from the bypass diodes 33, is positioned on the circuit board 37. The inverter member 35 functions to DC current (or DC voltage) supplied from the bypass diodes 33 into AC current (or AC voltage). The inverter member 35 may include a DC-AC converter 352 for converting DC current into AC current. In addition, the inverter member 35 may further include a current sensor 354, a capacitor 356, and a DC-DC converter 358, which are provided for stable conversion from DC current into AC current. The current sensor 354, the capacitor 356, the DC-DC converter 358, and the DC-AC converter 352 constituting the inverter member 35 may be integrated by the terminals 31 and/or bypass diodes 33 and the circuit board 37 or the circuit patterns formed on the circuit board 37.

The current sensor 354 is connected to the capacitor 356, the DC-DC converter 358, and the DC-AC converter 352 via the circuit patterns extending from the bypass diodes 33. The current sensor 354 functions to sense abnormality and other problems of current supplied from the bypass diodes 33 and to stop operations of the capacitor 356, the DC-DC converter 358, and the DC-AC converter 352 based on the sensed result. In this embodiment of the invention, the bypass diodes 33 and the current sensor 354 may be connected to each other via the circuit patterns formed on the circuit board 37 in the same case 39. In an instance in which the bypass diodes 33 and the current sensor 354 are connected to each other as described above, no additional output cable is needed, thereby simplifying the structure of the integrated type inverter 30.

The capacitor 356, which stores the DC current having passed through the current sensor 354 and supplies current having uniform voltage to the DC-DC converter 358, is connected to the current sensor 354. The current sensor 354 and the capacitor 356 may also be connected to each other via the circuit patterns formed on the circuit board 37 in the same case 39.

The current having voltage equalized by the capacitor 356 may be supplied to the DC-DC converter 358, which may convert the current having equalized voltage into current having a different level of DC voltage. In this embodiment of the invention, a plurality of DC-DC converters 358 may be provided. In an instance in which a plurality of DC-DC converters 358 is provided as described above, it is possible to reduce the thickness of each DC-DC converter 358 and thus to reduce the thickness of the integrated type inverter 30 such that the thickness of the integrated type inverter 30 is less than the height of the extension unit 24 as compared with an instance in which only one DC-DC converter 358 is provided. However, the invention is not limited thereto. Only one DC-DC converter 358 may be provided.

The DC current or DC voltage having passed through the DC-DC converter 358 may be supplied to the DC-AC converter 352, which may convert the DC current or DC voltage into AC current or AC voltage. The AC current or AC voltage may be supplied to an external device via the AC output cable 38 extending though the through hole 49*b* of the case 39. For example, the AC current or AC voltage may be supplied to another solar cell module 100, a power network, or a power system via the AC output cable 38.

Various conventional structures may be applied to the DC-AC converter 352, the current sensor 354, the capacitor 356, and the DC-DC converter 358. In addition, various other parts, such as a control member and a communication member, may be positioned on the circuit board 37.

As shown in FIG. 5, the circuit board 37 and the bypass diodes 33 and the inverter member 35 positioned on the circuit board 37 may be integrally wrapped by the potting member 372. In this embodiment of the invention, the potting member 372 may partially or entirely fill the inner space part 594 of the inner case 59.

In this embodiment of the invention, the potting member 372 may cover the bypass diodes 33, the inverter member 35, and the circuit board 37 while exposing the terminals 31, to which the ribbons 122 are connected. The terminals 31 are parts to which the ribbons 122 are connected. In an instance in which the terminals 31 are covered by the potting member 372, therefore, it is not possible to separate the ribbons 122 from the terminal 31 due to the potting member 372 when it is necessary or desired to replace the circuit unit 300. As a result, the ribbons 122 may be cut such that only portions of the ribbons 122 exposed outward from the potting member 372 can be used. For this reason, the length of the ribbons 122 may be decreased with the result that the ribbons 122 may not reach terminals of a new circuit unit 300 for replacement. In addition, in an instance in which the potting member 372 is also provided at the terminals of the new circuit unit 300 for replacement, it may not be possible to connect the ribbons 122 to the terminals 31.

In this embodiment of the invention, the potting member 372 is formed such that the terminals 31 are exposed from the potting member 372 in consideration of the above conditions. When it is necessary or desired to replace the circuit unit 300, therefore, the ribbons 122 may be separated from the terminals 31 in an instance in which the ribbons 122 are fixed to the terminals 31 in a separable state. In an instance in which the ribbons 122 are fixed to the terminals 31 by welding, the ribbons 122 may be easily separated from the terminals 31 by tearing the ribbons 122 off from the terminals 31. Consequently, it is possible to maintain the original length of the ribbons 122. In addition, the ribbons 122 may be easily fixed or connected to exposed terminals 31 of the newly replaced circuit unit 300.

In this embodiment of the invention, a first region in which the terminals 31 are positioned and a second region in which the bypass diodes 33 and the inverter member 35 are positioned may be partitioned from each other. The potting member 372 may be positioned in the second region (or may cover or wrap the second region). In this instance, an additional partition member for partitioning the first region and the second region may be further provided to physically prevent the potting member 372, which has mobility, from being formed at the terminals 31 during the manufacturing process.

In this embodiment of the invention, the terminals 31 may be formed at one surface of the circuit board 37, and the bypass diodes 33 and/or the inverter member 35 may be formed at another surface of the circuit board 37. That is, the bypass diodes 33 and/or the inverter member 35 may be formed at a first surface of the circuit board 37 adjacent to the solar cell panel 10, and the terminals 31 may be formed at a second surface of the circuit board 37 adjacent to the bottom surface 4942 of the receiving unit 491 or distant from the solar cell panel 10. Consequently, the terminals 31 and the bypass diodes 33, the terminals 31 and the inverter member 35, or the bypass diodes 33 and the inverter member 35 may be formed at the circuit board 37 while being connected to each other via contact holes, which are a kind of circuit pattern.

As a result, the first region and the second region may be clearly partitioned from each other such that the terminals 31 can be completely exposed. In addition, the inverter member 35, which has a relatively large thickness, may be positioned between the circuit board 37 and the bottom surface 4942 or 5942 of the receiving unit 491 or the inner case 59 such that the circuit board 37 and the receiving unit 491 can be spaced apart from each other by a sufficient distance to satisfy a sufficient insulation distance, and the terminals 31 may be adjacent to the outside such that work can be easily carried out through the opening 494*a* positioned at the bottom surface 4942 of the receiving unit 491 at the outside. However, the invention is not limited thereto. The terminals 31, the bypass diodes 33, and/or the inverter member 35 may be formed on the same surface of the circuit board 37. Various other modifications are also possible.

The potting member 372 covering the bypass diodes 33 and the inverter member 35 in the above description means partial covering as well as entire covering. That is, in an instance in which the bypass diodes 33 and the inverter member 35 have portions treated so as to have an insulation property, the potting member 372 may cover the bypass diodes 33 and the inverter member 35 excluding the treated portions thereof. For example, the potting member 372 may cover the circuit patterns, such as wires, of the bypass diodes 33 and the inverter member 35, which are exposed outward. Consequently, covering of the circuit patterns of the bypass diodes 33 and the inverter member 35 may mean that the circuit patterns of the bypass diodes 33 and the inverter member 35 are potted by the potting member 372. In addition, in an instance in which at least one selected from among the DC-AC converter 352, the current sensor 354, the capacitor 356, and the DC-DC converter 358 constituting the inverter member 35 is covered by the potting member 372, but the others are not covered by the potting member 372, it may mean that the inverter member 35 is potted by the potting member 372. For example, according to embodiments of the invention, the capacitor 356 may not be potted by the potting member 372.

The terminals 31, to which the ribbons 122 are connected, and/or the bypass diodes 33, which provide a bypass path, and the inverter member 35, which converts DC current into AC current, are integrated to form the integrated type inverter 30 of the solar cell module 100 with the above-stated construction. The installation process and the structure of the solar cell module 100 may be simplified through such integration. In addition, the bypass diodes 33 and the inverter member 35 are connected to each other via the circuit patterns without the use of an output cable (e.g. a DC output cable) for connection therebetween. Consequently, the structure of the solar cell module 100 may be simplified, and damage to the solar cell panel 10 which may be caused by the output cable may be prevented.

Conventionally, on the other hand, the junction box and the inverter are separately manufactured and fixed to the solar cell panel or the frame, and then the positive (+) output cable and the negative (−) output cable of the junction box are connected to the inverter. In addition, an AC output cable of the inverter is also provided. As a result, an installation space is increased, and installation time is increased. In addition, impact may be applied to the solar cell panel 10 during transportation or use due to the three output cables with the result that the solar cell panel 10 may be damaged and become inoperable.

Figure 9:
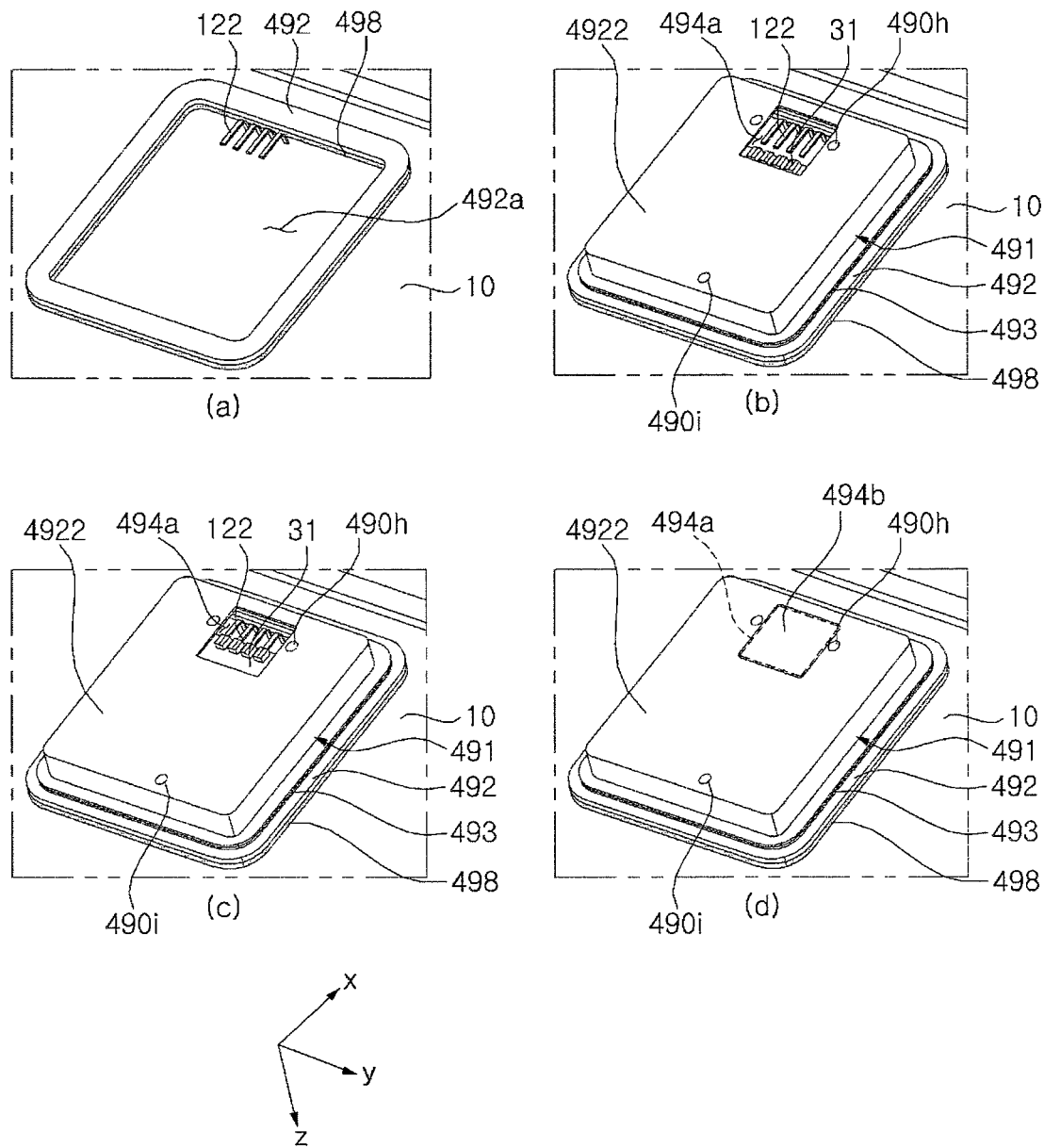
FIG. 9 is a perspective view showing a process of assembling the solar cell module of FIG. 1.

In addition, it is possible to easily perform assembly, replacement, inspection, and repair of the integrated type inverter 30, which will hereinafter be described in more detail with reference to FIG. 9. FIG. 9 is a perspective view showing a process of assembling the solar cell module of FIG. 1.

As shown in (a) of FIG. 9, the guide member 492 is fixed to the back surface of the solar cell panel 10 such that the ribbons 122 extending from the solar cells 12 (see FIG. 3) or the solar cell panel 10 through the holes formed through the second sealing layer 14*b* or the back substrate 18 are positioned in the closed space or the opening 492*a* of the guide member 492. More specifically, the guide member 492 is bonded to the back surface of the solar cell panel 10 using the second bonding member 498. In a state in which the second bonding member 498 is applied to the guide member 492, the guide member 492 may be pressed to the back surface of the solar cell panel 10. In a state in which the second bonding member 498 is applied to the back surface of the solar cell panel 10, the guide member 492 may be put on the second bonding member 498. Otherwise, in a state in which the second bonding member 498 and the guide member 492 are sequentially positioned on the solar cell panel 10, they may be fixed to each other by applying heat and pressure thereto. Various other modifications are also possible.

Subsequently, as shown in (b) of FIG. 9, the receiving unit 491, to which the inner case 59 (see FIG. 4) having the circuit unit 300 covered by the potting member 372 (see FIG. 4) positioned therein is fixed, is prepared, and the bonding flange 496 and the guide member 492 are adhered closely to each other. More specifically, the bonding flange 496 of the receiving unit 491 and the guide member 492 are bonded to each other in a state in which the first bonding member 493 is positioned between the bonding flange 496 and the guide member 492. In a state in which the first bonding member 493 is applied to the guide member 492, the bonding flange 496 may be pressed onto the first bonding member 493. In a state in which the first bonding member 493 is applied to the bonding flange 496, the bonding flange 496 may be pressed onto the guide member 492. Otherwise, in a state in which the second bonding member 498 and the bonding flange 496 are sequentially positioned on the guide member 492, they may be fixed to each other by applying heat and pressure thereto. Various other modifications are also possible.

At this time, the opening 494*a* formed at the bottom surface 4942 of the receiving unit 491 is not covered by the cover part 494*c*. As a result, the terminals 31 are exposed outward through the opening 494*a*.

Subsequently, as shown in (c) of FIG. 9, the ribbons 122 are fastened to the terminals 31 through the opening 494*a*. Since the terminals 31 and the ribbons 122 are exposed outward through the opening 494*a*, the ribbons 122 may be easily fixed to the terminals 31. The method of fastening or fixing the ribbons 122 to the terminals 31 was described in detail with reference to FIG. 8, and therefore a description thereof will be omitted.

Subsequently, as shown in (d) of FIG. 9, the cover part 494*b* is fixed to cover the opening 494*a*. More specifically, the cover part 494*b* is adhered to the bottom surface 4942 of the receiving unit 494 using the adhesive member 494*c* (see FIG. 4) positioned to surround the opening 494*a*. In a state in which the adhesive member 494*c* is applied to the bottom surface 4942 of the receiving unit 494 such that the adhesive member 494*c* surrounds the opening 494*a*, the cover part 494*b* may be pressed onto the adhesive member 494*c*. In a state in which the adhesive member 494*c* is applied to the edge of the cover part 494*b*, the cover part 494*b* may be pressed onto the bottom surface 4942 of the receiving unit 494. Otherwise, in a state in which the adhesive member 494*c* and the cover part 494*b* are sequentially positioned on the bottom surface 4942 of the receiving unit 494, they may be fixed to each other by applying heat and pressure thereto. Various other modifications are also possible.

Consequently, it is possible to stably fix the circuit unit 300 positioned in or fixed to the receiving unit 491 by adhering an outer case, which is constituted by the receiving unit 491 having at least one open surface, closely to the back surface of the solar cell panel 10. At this time, no additional cover part for covering the receiving unit 491 is provided. Consequently, it is possible to simplify the structure of the solar cell module and to reduce the assembly cost of the solar cell module.

In addition, in this embodiment of the invention, it is possible to easily repair the integrated type inverter 30 when the integrated type inverter 30 is damaged or to easily inspect the integrated type inverter 30 as needed or desired.

That is, when it is necessary or desired to repair or inspect the terminals 31 and the ribbons 122, a cutting tool may be moved along the cover part 494*b* in a state in which the cutting tool is put between the cover part 494*b* and the bottom surface 4942 to cut the adhesive member 494*c* such that the cover part 494*b* can be easily separated from the receiving unit 491. In a state in which the cover part 494*b* is separated from the receiving unit 491, it is possible to repair or inspect the terminals 31 and the ribbons 122 exposed outward through the opening 494*a*. After the repair or inspection is completed, the cover unit 494*b* may be fixed using the adhesive member 494*c* to cover the opening 494*a*.

In an instance in which repair, inspection, or replacement of the circuit unit 300 is needed or desired, the cutting tool may be moved along the bonding flange 496 or the guide member 492 in a state in which the cutting tool is put between the bonding flange 496 and the guide member 492 to cut the first bonding member 493 such that the receiving unit 491 can be easily separated from the solar cell panel 10. In a state in which the receiving unit 491 is separated from the solar cell panel 10, the circuit unit 300 may be repaired, or the damaged circuit unit 300 may be separated from the receiving unit 491 and then a new circuit unit 300 may be fixed to the receiving unit 491. Subsequently, the receiving unit 491 may be fixed to the guide member 492 using the first bonding member 493, whereby repair or replacement of the circuit unit 300 is completed.

Consequently, it is possible to easily repair or replace the circuit unit 300. In addition, in an instance in which it is necessary or desired to replace the circuit unit 300, it is possible to replace only the circuit unit 300 with a new one. Consequently, the receiving unit 491 and/or the inner case 59 may be used without replacement. As a result, it is possible to use the receiving unit 491 without replacement even when the integrated type inverter 30 is damaged, thereby reducing repair cost of the integrated type inverter 30. Particularly, in an instance in which the receiving unit 491 is formed of metal for improving durability of the receiving unit 491, it is possible to greatly reduce repair cost of the integrated type inverter 30.

In this embodiment of the invention, the integrated type inverter 30 is configured such that the circuit unit 300 is fixedly mounted in the receiving unit 491. Consequently, the circuit unit 300 may be spaced apart from the solar cell panel 10 by a predetermined distance. More specifically, the circuit unit 300 may have a thickness equal to or less than that of the receiving unit 491 such that the entirety of the circuit unit 300 can be received in the receiving unit 491. For stable installation, the circuit unit 300 may have a thickness less than that of the receiving unit 491. In addition, since the bonding members 493 and 498 and/or the guide member 492 are positioned between the receiving unit 491 and the solar cell panel 10, the circuit unit 300 is spaced apart from the solar cell panel 10 by the thicknesses thereof. Consequently, a distance D1 (see FIG. 10) between the center of the circuit unit 300 (the center of the circuit unit 300 in a thickness direction of the integrated type inverter 30) and the solar cell panel 10 may be greater than a distance D2 (see FIG. 10) between the center of the circuit unit 300 and the receiving unit 491. That is, a space corresponding to the thicknesses of the bonding members 493 and 498 and/or the guide member 492 is defined between the circuit unit 300 and the solar cell panel 10, and the circuit unit 300 is mounted in the receiving unit 491 in a state in which the circuit unit 300 is adjacent to or in contact with the receiving unit 491.

At this time, if heat is transferred toward the solar cell panel 10, the heat is transferred through a space between the circuit unit 300 and the solar cell panel 10 by radiation through the space. The space between the circuit unit 300 and the solar cell panel 10 has first thermal conductivity that is relatively low, and thus, it is difficult to dissipate the heat. On the other hand, the circuit unit 300 is mounted or fixed to the receiving unit 491 in a state in which the circuit unit 300 is adjacent to or in contact with the receiving unit 491. Consequently, heat is transferred by conduction through the receiving unit 491 having second first thermal conductivity higher than the first thermal conductivity. As a result, heat generated from the circuit unit 300 is dissipated outward through the receiving unit 491. That is, the receiving unit 491 constitutes a heat dissipation path.

That is, in this embodiment of the invention, the receiving unit 491 is positioned at the opposite side of the solar cell panel 10 on the basis of the circuit unit 300. As a result, the heat dissipation path is formed only in a direction opposite to the solar cell panel 10. Consequently, heat dissipation to the solar cell panel 10 does not occur, and therefore it is possible to prevent lowering or deterioration in properties of the solar cell panel 10 due to heat generated from the circuit unit 300. On the other hand, in an instance in which the receiving unit 491 or the case is positioned at both opposite sides of the circuit unit 300, i.e., the receiving unit 491 or the case is positioned even at the solar cell panel 10, heat is conducted by the receiving unit 491 or the case positioned at the solar cell panel 10 with the result that the heat may be easily transferred to the solar cell panel 10.

In the above embodiment of the invention, the circuit unit 300 is mounted in the receiving unit 491 such that the distance between the circuit unit 300 and the receiving unit 491 is reduced to dissipate heat generated from the circuit unit 300 to the receiving unit 491. In addition, the structure of the integrated type inverter 30 may be modified to improve a heat dissipation property of the integrated type inverter 30. Modifications of the integrated type inverter 30 will hereinafter be described in more detail with reference to FIGS. 10 and 11.

Figure 10:
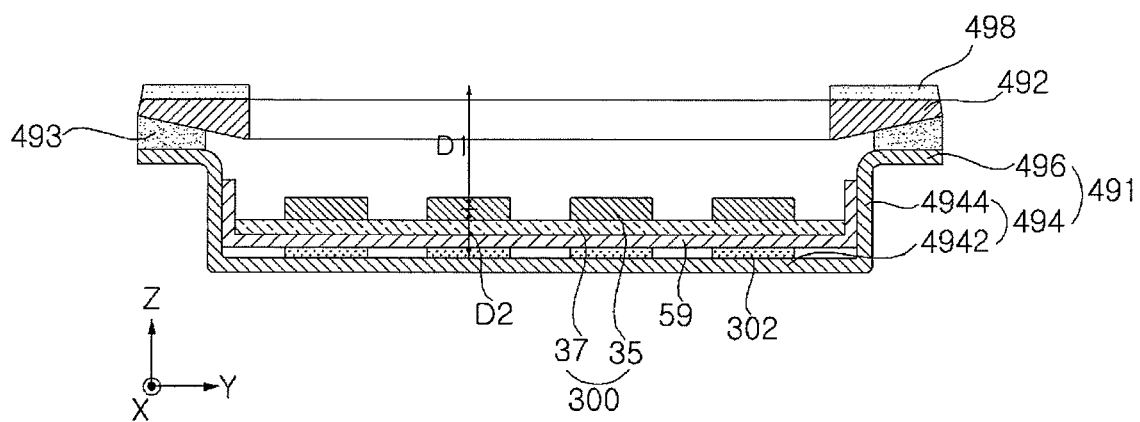
FIG. 10 is a sectional view schematically showing an integrated type inverter according to a modification of the invention.

FIG. 10 is a sectional view schematically showing an integrated type inverter according to a modification of the invention. In FIG. 10, the circuit unit 300 is schematically shown.

As shown in FIG. 10, a heat dissipation layer 302 having thermal conductivity higher than that of the circuit unit 300 (specifically, the circuit board 37) may be positioned between the circuit unit 300 and the receiving unit 491. The heat dissipation layer 302 may be entirely positioned between the inner case 59 and the receiving unit 491. Alternatively, the heat dissipation layer 302 may be partially positioned so as to correspond to components of the circuit unit 300 which generate a large amount of heat (e.g. the inverter member 35, specifically the DC-AC converters 352 (see FIG. 4) or the DC-DC converters 358 (see FIG. 4)). In the figure, the heat dissipation layer 302 is positioned between the inner case 59, in the circuit unit 300 is received and fixed, and the receiving unit 491 so as to correspond to the inverter member 35. However, the invention is not limited thereto. In an instance in which the heat dissipation layer 302 is formed of an insulative material, the inner case 59 may be provided with openings corresponding to the components of the circuit unit 300 which generate a large amount of heat (e.g. the inverter member 35, specifically the DC-AC converters 352 or the DC-DC converters 358), and the heat dissipation layer 302 may be positioned to cover the openings. In this instance, the inner case 59 is not positioned between the components of the circuit unit 300 which generate a large amount of heat and the receiving unit 491, but the components of the circuit unit 300 which generate a large amount of heat and the receiving unit 491 may directly contact the heat dissipation layer 302, thereby further improving the heat dissipation property of the integrated type inverter. In the figure, the components of the circuit unit 300 which generate a large amount of heat (e.g. the inverter member 35, specifically the DC-AC converters 352 or the DC-DC converters 358) are illustrated as being formed at a surface of the circuit board 37 opposite to the solar cell panel 10. However, the invention is not limited thereto. The components of the circuit unit 300 which generate a large amount of heat (e.g. the inverter member 35, specifically the DC-AC converters 352 or the DC-DC converters 358) may be formed at a surface of the circuit board 37 opposite to the receiving unit 491 or through the circuit board 37, thereby further improving the heat dissipation property of the integrated type inverter.

The heat dissipation layer 302 may be formed of various materials while having various structures to exhibit high thermal conductivity such that heat dissipation to the receiving unit 491 can be more easily performed. For example, the heat dissipation layer 302 may be formed of metal exhibiting high thermal conductivity. In an instance in which an aluminum layer or an aluminum structure (aluminum block) is used as the heat dissipation layer 302, it is possible to improve the heat dissipation property of the integrated type inverter due to high thermal conductivity of the heat dissipation layer 302. In addition, the cost and weight of the heat dissipation layer 302 may be reduced. Alternatively, the heat dissipation layer 302 may be formed of an insulative material. In this instance, it is possible to more stably insulate the circuit unit 300, thereby further improving the insulation property of the heat dissipation layer 302. For example, the heat dissipation layer 302 may be formed of graphite or a gel pad (e.g. silicon or polyurethane).

In the figure, a heat dissipation structure including the heat dissipation layer 302 is illustrated as being positioned at the inside of the bottom surface 4942 of the receiving unit 491. However, the invention is not limited thereto. The heat dissipation structure may be positioned at the outside of the bottom surface 4942 of the receiving unit 491. As described above, the heat dissipation structure includes the heat dissipation layer 302. Alternatively, the heat dissipation structure may include a plurality of heat dissipation fins. In this instance, the surface area of the heat dissipation structure may be increased. Various other structures and mechanisms may be applied to the heat dissipation structure.

Figure 11:
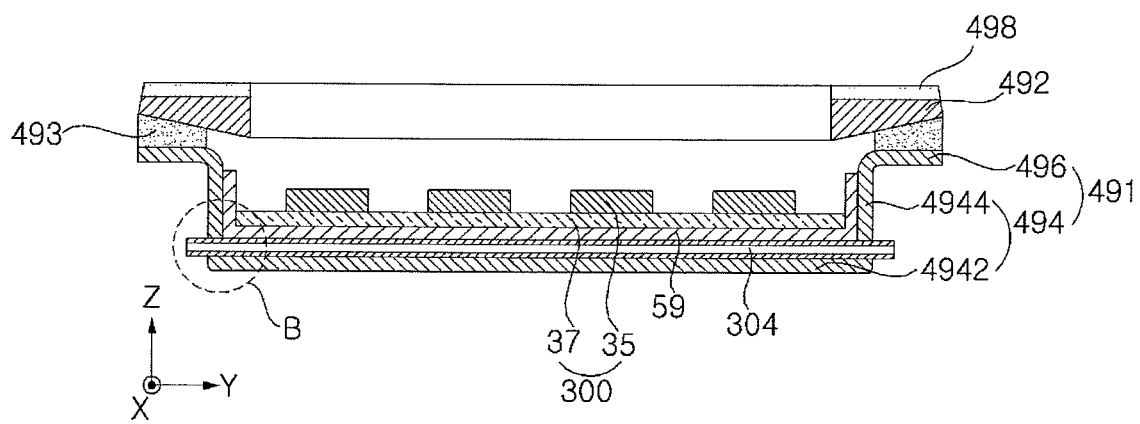
FIG. 11 is a sectional view schematically showing an integrated type inverter according to another modification of the invention, and an enlarged view thereof.
Figure 11:
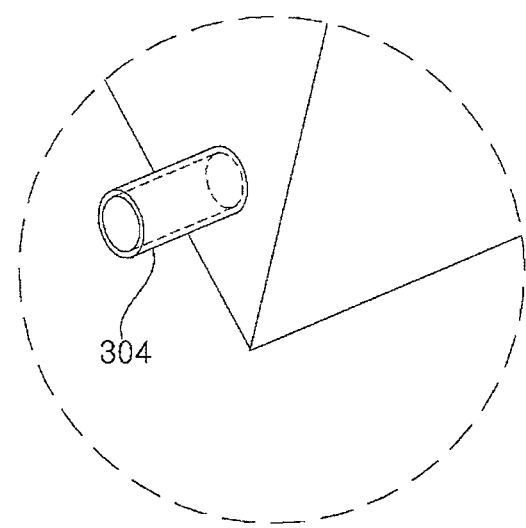

FIG. 11 is a sectional view and a partial perspective view schematically showing an integrated type inverter according to another modification of the invention. In FIG. 11, the circuit unit 300 is schematically shown. (a) of FIG. 11 is a sectional view of the integrated type inverter, and (b) of FIG. 11 is an enlarged perspective view showing part B of (a) of FIG. 11.

As shown in FIG. 11, a cooling member 304 may be positioned between the circuit unit 300 and the bottom surface of the receiving unit 491 in a state in which the cooling member 304 extends through the receiving unit 491. The cooling member 304 may extend through the receiving unit 491 from one side surface 4944 to the other side surface 4944 of the receiving unit 491 for effectively cooling the circuit unit 300 while not lowering or degrading the sealing property of the receiving unit 491. For example, the cooling member 304 may be formed of a material exhibiting higher thermal conductivity than the circuit unit 300. A material suitable for the heat dissipation layer 302 may be used as the material of the cooling member 304. Alternatively, the cooling member 304 may include a pipe open at opposite sides thereof. In this instance, a cooling medium (e.g. cooling water, solid cooling matter, or cooling air) may flow in the pipe for cooling the integrated type inverter. The cooling medium may be forcibly supplied into the pipe, or an external air as the cooling medium may flow along the pipe. Various other modifications are also possible.

Figure 12:
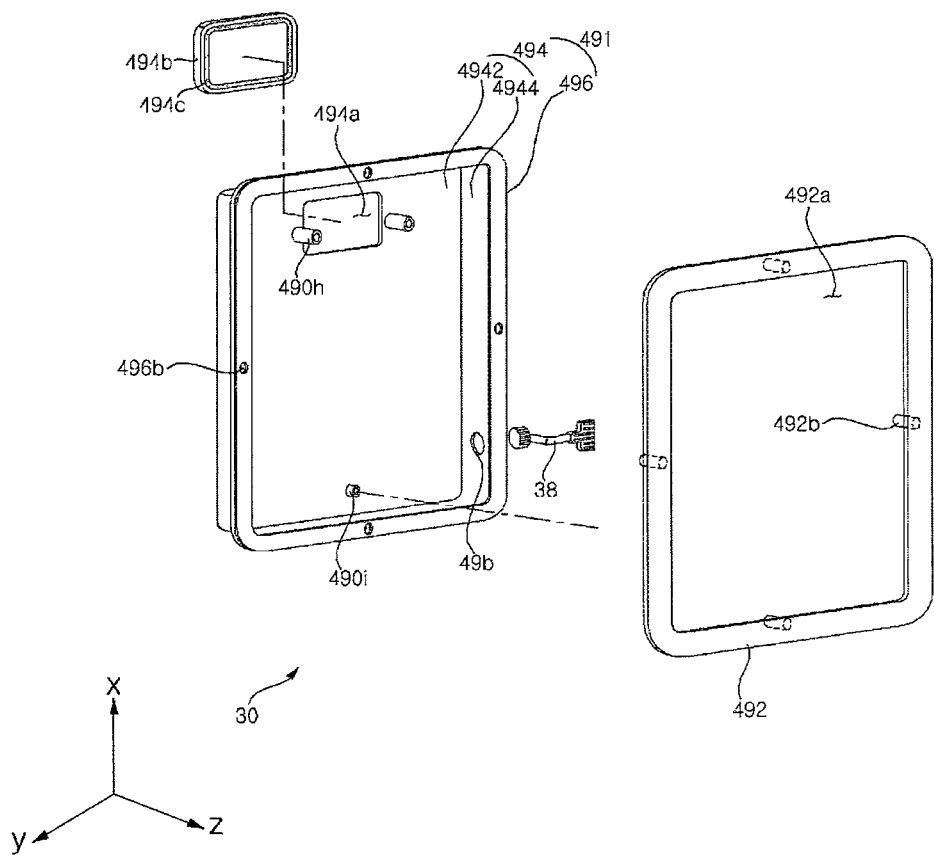
FIG. 12 is a perspective showing a receiving unit and a guide member of an integrated type inverter according to another embodiment of the invention.

Hereinafter, an integrated type inverter 30 according to another embodiment of the invention will be described in detail with reference to FIG. 12. FIG. 12 is a perspective showing a receiving unit 491 and a guide member 492 of an integrated type inverter 30 according to another embodiment of the invention. For clarity, only components of the integrated type inverter 30 to be described are shown in FIG. 12, and other components of the integrated type inverter 30 omitted from FIG. 12 may be identical to or similar to those described with reference to FIGS. 1 to 11. Consequently, components of the integrated type inverter which are not shown in FIG. 12 and described with reference to FIG. 12 may correspond to those of the integrated type inverter shown in FIGS. 1 to 11 and described with reference to FIGS. 1 to 11. In addition, the embodiments of the invention shown in FIGS. 1 to 11 and the modifications thereof may be freely combined with the embodiment of the invention shown in FIG. 12 and modifications thereof.

Referring to FIG. 12, holes 496b may be formed at the bonding flange 496 of the receiving unit 491, and protrusions 492b, which are inserted into the holes 496b, may be formed at a surface of the guide member 492 opposite to the bonding flange 496. It is possible to easily align the bonding flange 496 on the guide member 492 by inserting the protrusions 492b of the guide member 492 into the holes 496b of the bonding flange 496. That is, alignment marks may be formed at the bonding flange 496 and the guide member 492 such that the bonding flange 496 is easily aligned with the guide member 492.

In the same manner as in the previous embodiments of the invention, the first bonding member 493 (see FIG. 4) may be positioned between the bonding flange 496 and the guide member 492, and the second bonding member 498 may be positioned between the guide member 492 and the solar cell panel 10 (see FIG. 4) such that the integrated type inverter 30 can be fixed to the solar cell panel 10.

In the figure, the holes 496b are illustrated as being formed at the bonding flange 496, and the protrusions 492b corresponding to the bonding flange 496 are illustrated as being formed at the guide member 492. However, the invention is not limited thereto. The protrusion may be formed at the bonding flange 496, and the holes may be formed at the guide member 492. Alternatively, various alignment marks may be formed at the bonding flange 496 and the guide member 492. In addition, in the figure, one hole 496b and one protrusion 492b used as the alignment marks are illustrated as being formed at a middle part of each side of the bonding flange 496 and the guide member 492. However, the invention is not limited thereto. The number, position, etc. of the alignment marks may be variously changed.

As is apparent from the above description, the integrated type inverter of the solar cell module according to the embodiment of the invention is formed such that the terminals, to which the ribbons are connected, and/or the bypass diodes, which provide the bypass path, and the inverter member, which converts DC current into AC current, are integrated. The installation process and the structure of the solar cell module may be simplified through such integration. Furthermore, the terminals and/or the bypass diodes and the inverter member may be connected to each other via the circuit patterns without the use of an output cable (e.g. a DC output cable) for connection therebetween. Consequently, the structure of the solar cell module may be simplified, and damage to the solar cell panel which may be caused by the output cable may be prevented.

In addition, the open surface of the receiving unit forming the external shape or the outer surface of the integrated type inverter while receiving the circuit unit of the integrated type inverter may be covered by the solar cell panel. Consequently, it is possible to easily repair or replace the integrated type inverter while stably protecting the circuit unit. In addition, it is possible to simplify the structure of the integrated type inverter, to reduce the thickness of the integrated type inverter by a thickness of the cover part, and to reduce the quantity of the material used for the outer case, thereby reducing manufacturing cost of the integrated type inverter.

The above described features, configurations, effects, and the like are included in at least one of the embodiments of the invention, and should not be limited to only one embodiment of the invention. In addition, the features, configurations, effects, and the like as illustrated in each embodiment of the invention may be implemented with regard to other embodiments of the invention as they are combined with one another or modified by those skilled in the art. Thus, content related to these combinations and modifications should be construed as included in the scope and spirit of the invention as disclosed in the accompanying claims.

What is claimed is:
1. A solar cell module comprising:
a solar cell panel; and
an integrated type inverter positioned at a back surface of the solar cell panel, wherein the integrated type inverter includes:
a circuit unit having a terminal connected to a ribbon extended from the solar cell panel and an inverter member having a DC-AC inverter electrically connected to the terminal; and
a receiving unit including:
a bottom surface spaced apart from a back surface of the solar cell panel and receiving the terminal and the DC-AC inverter,
a side surface protruding from the bottom surface towards the back surface of the solar cell panel,
a bonding flange extending from an upper end of the side surface parallel to the solar cell panel,
an adhesive member positioned between the bonding flange and the back surface of the solar panel, wherein the bottom surface, the side surface and the bonding flange are formed as an integrated structure,
an inner space defined by the bottom surface, the side surface of the receiving unit and the back surface of the solar cell panel, and
a single AC output cable connected to the DC-AC inverter,
wherein the inner space is a closed space and the back surface of the solar panel is directly exposed to the inner space,
wherein the circuit unit is located on the bottom surface through a spacer,
wherein the bottom surface has an opening positioned corresponding to the terminal and a cover covering the opening,
wherein the opening has a size smaller than a size of an open surface of the receiving unit, wherein the open surface of the receiving unit is sealed by the back surface of the solar cell panel, and
wherein the cover has an area smaller than an area of the bottom surface of the receiving unit.

2. The solar cell module according to claim 1, wherein the circuit unit is adjacent to the bottom surface of the receiving unit, and
thermal conductivity of the receiving unit is higher than thermal conductivity of a space between the circuit unit such that the receiving unit constitutes a heat dissipation path.

3. The solar cell module according to claim 1, wherein the receiving unit has a heat dissipation structure formed at least one of an inside and an outside of a bottom surface of the receiving unit.

4. The solar cell module according to claim 3, wherein the heat dissipation structure includes at least one of a heat dissipation layer, a heat dissipation fin, and a cooling member penetrating through the receiving unit.

5. The solar cell module according to claim 1, wherein the bonding flange is adjacent to the solar cell panel.

6. The solar cell module according to claim 1, further comprising a circuit board,
wherein the terminal and the inverter member are formed at the circuit board such that the terminal and the inverter member are connected to each other via a circuit pattern of the circuit board, and
the terminal is positioned at a surface of the circuit board opposite to the solar cell panel.

7. The solar cell module according to claim 1, further comprising a bypass diode electrically connected between the terminal and the inverter member.

8. The solar cell module according to claim 5, wherein the bonding flange extends from an entire end of the inner space to surround the inner space when viewed in a plan view, and
the bonding flange has a flat surface formed on the same plane.

9. The solar cell module according to claim 1, wherein the solar cell panel comprises a solar cell and the ribbon connected to the solar cell, and
the ribbon is fixed to the terminal in the receiving unit.

10. The solar cell module according to claim 1, wherein the receiving unit includes a through hole for connection between the circuit unit and an external device.

11. The solar cell module according to claim 5, further comprising a guide member positioned between the bonding flange and the solar cell panel, the guide member having a shape corresponding to the bonding flange.

12. The solar cell module according to claim 11, wherein the bonding flange entirely overlaps the guide member.

13. The solar cell module according to claim 11, wherein the guide member has a width equal to or greater than that of the bonding flange.

14. The solar cell module according to claim 13, wherein a ratio in width of the bonding flange:the guide member is 1:1 to 1:10.

15. The solar cell module according to claim 11, further comprising:
a first bonding member positioned between the bonding flange and the guide member for bonding the bonding flange and the guide member; and
a second bonding member positioned between the guide member and the solar cell panel for bonding the guide member and the solar cell panel.

16. The solar cell module according to claim 11, wherein the solar cell panel includes a solar cell and the ribbon connected to the solar cell, and
the guide member is provided with an opening, through which the ribbon penetrates.

17. The solar cell module according to claim 11, wherein at least one of the bonding flange and the guide member is provided with an alignment mark.

18. The solar cell module according to claim 1, further comprising:
an inner case positioned in the inner space, the inner case being fixed to the receiving unit,
wherein the circuit unit is disposed in the inner case, and
wherein the inner case is between the receiving unit and the circuit unit.

* * * * *